United States Patent
Jung et al.

(10) Patent No.: US 10,021,584 B2
(45) Date of Patent: Jul. 10, 2018

(54) REPORTING BANDWIDTH MEASUREMENTS BY A WIRELESS DEVICE FOR CELL RESELECTION

(71) Applicant: LG ELECTRONICS INC., Seoul (KR)

(72) Inventors: Sunghoon Jung, Seoul (KR); Youngdae Lee, Seoul (KR); Sungjun Park, Seoul (KR); Seungjune Yi, Seoul (KR); Jaewook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 71 days.

(21) Appl. No.: 14/443,585

(22) PCT Filed: Nov. 19, 2013

(86) PCT No.: PCT/KR2013/010514
§ 371 (c)(1),
(2) Date: May 18, 2015

(87) PCT Pub. No.: WO2014/077658
PCT Pub. Date: May 22, 2014

(65) Prior Publication Data
US 2015/0289156 A1     Oct. 8, 2015

Related U.S. Application Data
(60) Provisional application No. 61/728,181, filed on Nov. 19, 2012.

(51) Int. Cl.
*H04W 24/10* (2009.01)
(52) U.S. Cl.
CPC .................................. *H04W 24/10* (2013.01)
(58) Field of Classification Search
None
See application file for complete search history.

(56) References Cited

U.S. PATENT DOCUMENTS

| 2007/0098098 A1 | 5/2007 | Xiao et al. |
| 2008/0214198 A1* | 9/2008 | Chen ............... H04L 1/0026 455/450 |

(Continued)

FOREIGN PATENT DOCUMENTS

| JP | 2009-514359 A | 4/2009 |
| JP | 2009-159533 A | 7/2009 |

(Continued)

OTHER PUBLICATIONS

Minimization of Drive Tests Solution in 3GPP; IEEE Communications Magazine • Jun. 2012; Wuri A. Hapsari, Anil Umesh, and Mikio Iwamura, NTT DOCOMO, Inc. Maigorzata Tomala, Bódog Gyula, and Benoist Sébire, Nokia Siemens Networks.*

(Continued)

*Primary Examiner* — Hassan Kizou
*Assistant Examiner* — Deepa Belur
(74) *Attorney, Agent, or Firm* — Birch, Stewart, Kolasch & Birch, LLP

(57) ABSTRACT

A method of sending a handover failure report in a wireless communication system is provided. The method is performed by user equipment (UE) and can include detecting a handover failure, and sending, to a base station (BS), the handover failure report including a first Reference Signal Received Quality (RSRQ) measurement result for a first cell and a first wideband indicator for the first RSRQ measurement result after the handover failure is detected, wherein the first RSRQ measurement result is a result of performing RSRQ measurement, and the first wideband indicator indicates whether a wide bandwidth is used when performing RSRQ measurement.

8 Claims, 22 Drawing Sheets

(56) References Cited

U.S. PATENT DOCUMENTS

| | | | |
|---|---|---|---|
| 2009/0028112 A1* | 1/2009 | Attar | H04W 36/245 370/332 |
| 2009/0046647 A1 | 2/2009 | Roh et al. | |
| 2009/0170442 A1 | 7/2009 | Asanuma et al. | |
| 2010/0322329 A1 | 12/2010 | Yoo et al. | |
| 2010/0325267 A1* | 12/2010 | Mishra | H04L 41/069 709/224 |
| 2011/0110251 A1 | 5/2011 | Krishnamurthy et al. | |
| 2011/0110254 A1 | 5/2011 | Ji et al. | |
| 2011/0211482 A1 | 9/2011 | Hoshino et al. | |
| 2012/0108241 A1* | 5/2012 | Wu | H04W 24/10 455/436 |
| 2013/0040683 A1* | 2/2013 | Siomina | H04W 28/0236 455/517 |
| 2013/0094381 A1* | 4/2013 | Han | H04W 24/10 370/252 |
| 2013/0242898 A1* | 9/2013 | Johansson | H04W 76/027 370/329 |
| 2013/0288663 A1 | 10/2013 | Kazmi et al. | |
| 2014/0043989 A1* | 2/2014 | Dalsgaard | H04W 24/10 370/252 |
| 2014/0126403 A1* | 5/2014 | Siomina | H04W 24/10 370/252 |
| 2015/0023188 A1* | 1/2015 | Das | H04W 24/10 370/252 |
| 2015/0148063 A1* | 5/2015 | Jung | H04W 24/10 455/456.1 |
| 2015/0304927 A1* | 10/2015 | Takahashi | H04W 48/16 455/436 |
| 2016/0150436 A1* | 5/2016 | Olsson | H04W 76/028 455/424 |
| 2016/0278115 A1* | 9/2016 | Shrader | H04W 72/1284 |

FOREIGN PATENT DOCUMENTS

| | | |
|---|---|---|
| JP | 2010-536227 A | 11/2010 |
| KR | 10-2009-0108615 A | 10/2009 |
| KR | 10-2010-0059931 A | 6/2010 |
| KR | 10-2010-0136913 A | 12/2010 |
| KR | 10-2012-0091436 A | 8/2012 |
| KR | 10-2012-0105327 A | 9/2012 |
| WO | WO 2008/097185 A2 | 8/2008 |
| WO | WO 2009/057729 A2 | 5/2009 |
| WO | WO 2011/005524 A2 | 1/2011 |
| WO | WO 2012/124991 A2 | 9/2012 |
| WO | WO 2014/023878 A1 | 2/2014 |

OTHER PUBLICATIONS

Nokia Siemens Networks et al., "On CQI measurements and compression for eNode-B RRM support," 3GPP TSG RAN WG1 #50-bis Meeting, R1-074351, Shanghai, Oct. 8-12, 2007, 8 pgs.

Panasonic, "Selected sub-band CQI reporting," 3GPP TSG-RAN WG1 Meeting #50bis, R1-074415, Shanghai, China, Oct. 8-12, 2007, pp. 1-7.

3GPP, "3rd Generation Partnership Project; Technical Specification Group Radio Access Network; Universal Terrestrial Radio Access (UTRA) and Evolved Universal Terrestrial Radio Access (E-UTRA); Radio measurement collection for Minimization . . . " 3GPP TS 37.320 V11.1.0, Sep. 2012, pp. 1-21.

Mediatek, "MDT measurements, remaining issues," 3GPP TSG-RAN WG2 Meeting #72bis, Dublin, Ireland, Jan. 17-21, 2010, R2-110191, pp. 1-5.

NTT DOCOMO, Inc., "Introduction of wideband RSRQ measurements," 3GPP TSG-RAN WG2 #80, New Orleans, USA, Nov. 12-16, 2012, R2-125661, pp. 1-3.

3rd Generation Partnership Project, "Technical Specification Group Radio Access Network; Universal Terrestrial Radio Access (UTRA) and Evolved Universal Terrestrial Radio Access (E-UTRA) . . . " 3GPP TS 37.320, V11.1.0, Sep. 2012, pp. 1-21.

Ericsson et al., "Network Triggered Wideband RSRQ Measurement and Requirements," 3GPP TSG RAN WG4 Meeting #63AH, R4-63AH-0155, Oulu, Finland, Jun. 26-28, 2012, pp. 1-7.

Alcatel-Lucent, "More Discussions on the RSRQ Measurement Bandwidth," 3GPP TSG-RAN WG4 Meeting #64, R4-123905, Qingdao, China, May 13-17, 2012, pp. 1-3.

Ericsson et al., "Agreements on Wideband RSRQ," TSG RAN WG4 Meeting #64, R4-124981, Qingdao, China, Aug. 13-17, 2012, 4 pages.

Ericsson et al., "Analysis of Requirements for Wideband RSRQ," 3GPP TSG RAN WG4 Meeting #64bis, R4-125392, Santa Rosa, U.S., Oct. 8-12, 2012, pp. 1-3.

Nokia Corporation et al., "Wider Bandwidth RSRQ Measurements for Idle Mode," 3GPP TSG-RAN4 #65, R4-126502, New Orleans, USA, Nov. 12-16, 2012, 2 pages.

Renesas Mobile Europe LTD, "RSRQ Definition for Wideband RSRQ," 3GPP TSG-RAN WG4 Meeting #65, R4-126467, New Orleans, USA, Nov. 12-16, 2012, 4 pages.

* cited by examiner

REPORTING BANDWIDTH MEASUREMENTS BY A WIRELESS DEVICE FOR CELL RESELECTION

CROSS REFERENCE TO RELATED APPLICATIONS

This application is the National Phase of PCT International Application No. PCT/KR2013/010514, filed on Nov. 19, 2013, which claims priority under 35 U.S.C. 119(e) to U.S. Provisional Application No. 61/728,181, filed on Nov. 19, 2012, all of which are hereby expressly incorporated by reference into the present application.

BACKGROUND OF THE INVENTION

Field of the Invention

The present invention relates to wireless communication and, more particularly, to a method of reporting measurement in a wireless communication system and an apparatus for supporting the same.

Related Art

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

A terminal may perform measurement and a report based on information for measurement received from a network. The measurement and the measurement report performed by the terminal may have a direct influence on the execution of the mobility of the terminal, such as cell reselection/handover. Furthermore, the network may adaptively provide the terminal with service using the measurement result reported to the network.

A network may provide a terminal with a parameter for wideband measurement. The terminal may perform wideband measurement using the wideband measurement parameter and report a measurement result to the network. When the terminal reports the measurement result, the network may be unaware whether the measurement result is a wideband measurement result or a narrowband measurement result that is not the wideband measurement result. Since the terminal does not provide signaling regarding that the reported measurement result has been obtained through what measurement, the network may be unaware that the measurement result is based on what measurement. Such a phenomenon may not comply with the original object of measurement and a report that are performed for a network optimization operation.

SUMMARY OF THE INVENTION

An object of the present invention is to provide a method of reporting measurement in a wireless communication system and an apparatus for supporting the same.

In an aspect, a method of reporting measurement performed by user equipment in a wireless communication system is provided. The method comprises obtaining a first measurement result by performing measurement, generating first measurement bandwidth information related to the first measurement result and sending a measurement report message to a network. The measurement report message comprises the first measurement result and the first measurement bandwidth information, and the first measurement bandwidth information comprises information related to a measurement bandwidth for the first measurement result.

The first measurement bandwidth information may indicate whether the measurement performed in order to obtain the first measurement result is wideband measurement or narrowband measurement.

If the measurement bandwidth for the first measurement result is greater than a specific threshold bandwidth, the first measurement bandwidth information may indicate the wideband measurement. If the measurement bandwidth for the first measurement result is smaller than the specific threshold bandwidth, the first measurement bandwidth information may indicate the narrowband measurement.

The specific threshold bandwidth may comprise a bandwidth corresponding to six resource blocks.

The method may further comprise obtaining a second measurement result by performing measurement, wherein the measurement report message further comprises the second measurement result.

The method may further comprise generating second measurement bandwidth information related to the second measurement result, wherein the measurement report message further comprises the second measurement bandwidth information.

The method may further comprise generating second measurement bandwidth information related to the second measurement result if a serving cell of the UE when obtaining the second measurement result is different from a serving cell of the UE when obtaining the first measurement result, wherein the measurement report message further comprises the second measurement bandwidth information.

The method may further comprise generating second measurement bandwidth information related to the second measurement result if a measurement bandwidth for the second measurement result is different from the measurement bandwidth for the first measurement result, wherein the measurement report message further comprises the second measurement bandwidth information.

In another aspect, a wireless apparatus operating in a wireless communication system in provided. The apparatus comprises a radio frequency (RF) unit that sends and receives radio signals and a processor that is functionally coupled to the RF unit. The processor is configured to obtain a first measurement result by performing measurement, generate first measurement bandwidth information related to the first measurement result and send a measurement report message to a network. The measurement report message comprises the first measurement result and the first measurement bandwidth information, and the first measurement bandwidth information comprises information related to a measurement bandwidth for the first measurement result.

In accordance with the method of reporting measurement according to an embodiment of the present invention, a network can check whether a measurement result reported by UE has been obtained based on wideband measurement or has been obtained based on narrowband measurement. Alternatively, the network can check a measurement bandwidth related to the reported measurement result. Accordingly, the network can more effectively network optimization depending on the use of the obtained measurement result, can provide more efficient service, and can provide the UE with a configuration for the efficient operation of the UE.

DESCRIPTION OF EXEMPLARY EMBODIMENTS

Figure 1:
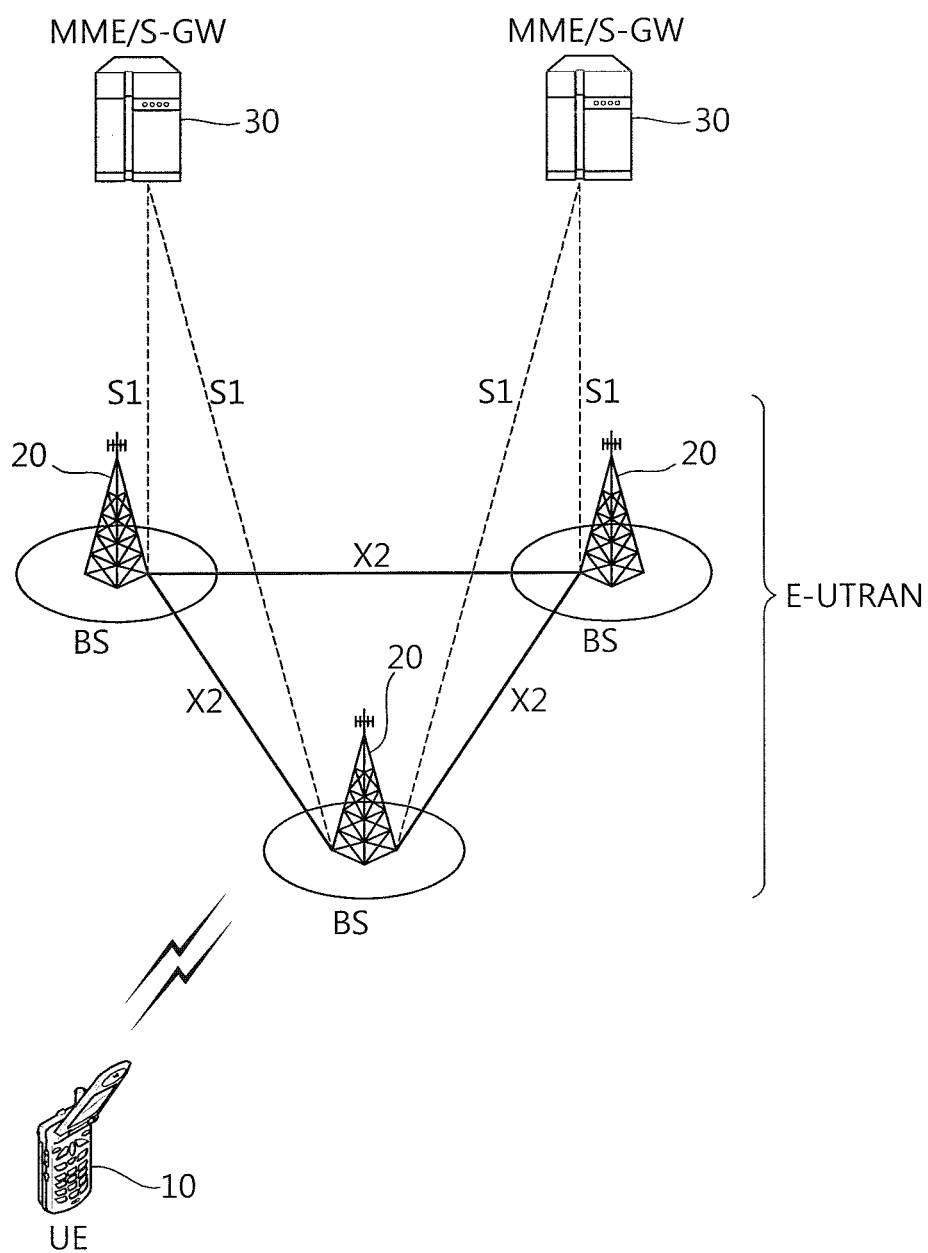
FIG. 1 illustrates a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
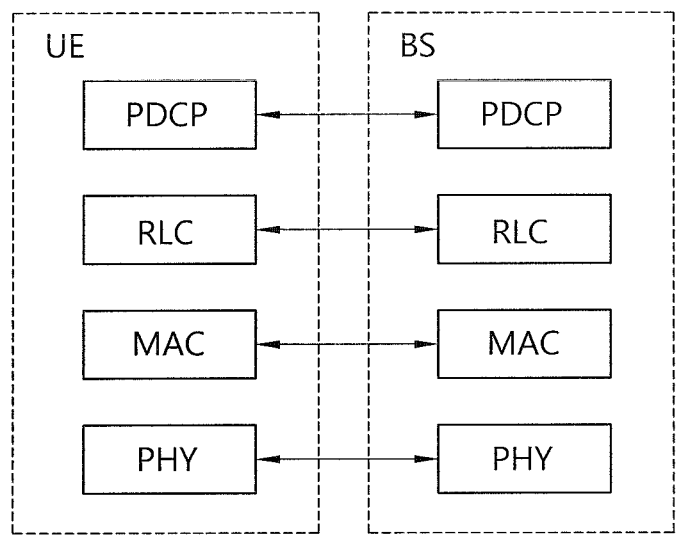
FIG. 2 is a block diagram showing the structure of a wireless protocol on the user plane.
Figure 3:
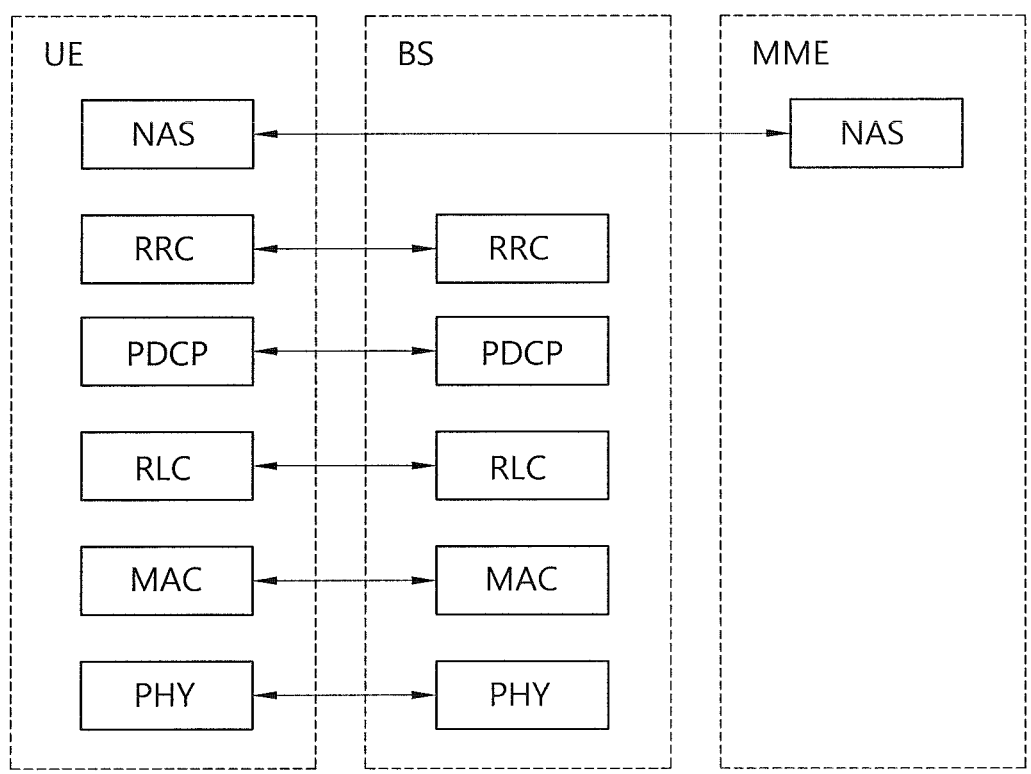
FIG. 3 is a block diagram showing the structure of a wireless protocol on the control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell.

In accordance with Paragraph 5.2.2 of 3GPP TS36.331 V8.7.0 (2009-09) "Radio Resource Control (RRC); Protocol specification (Release 8)", the system information is classified into a Master Information Block (MIB), a Scheduling Block (SB), and a System Information Block (SIB). The MIB informs UE of the physical configuration of a corresponding cell, for example, a bandwidth. The SB informs UE of information about the transmission of SIBs, for example, a transmission cycle. The SIB is a set of pieces of correlated system information. For example, a specific SIB includes only information about surrounding cells, and a specific SIB includes only information about an uplink radio channel used by UE.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
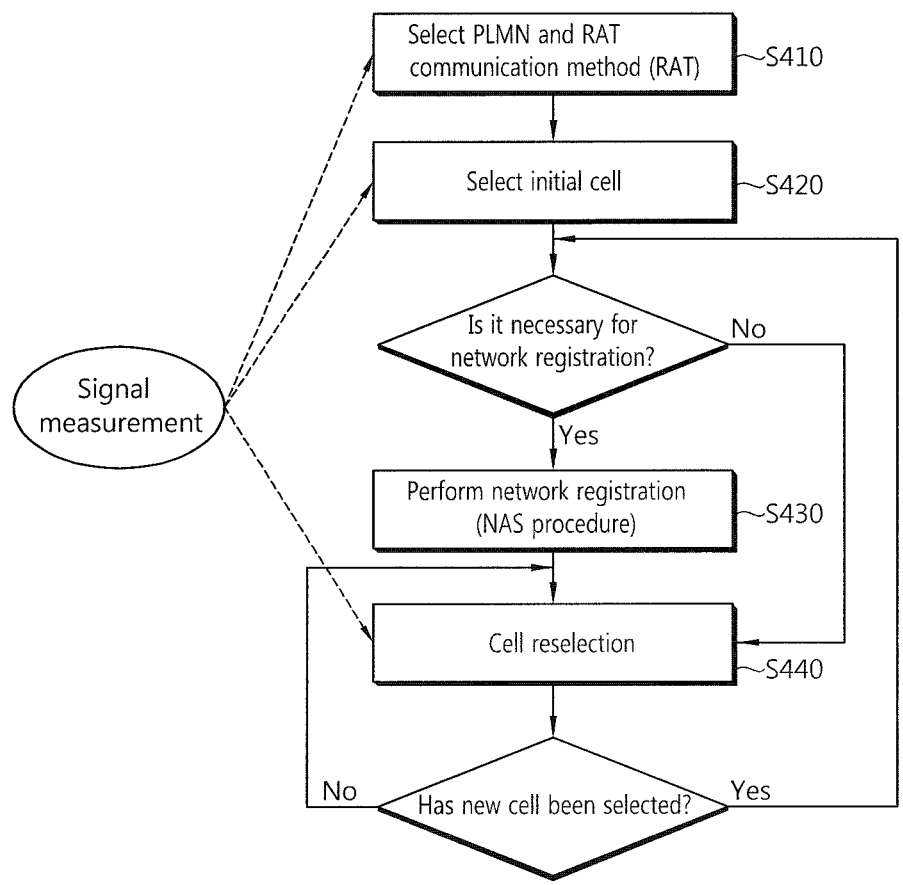
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.

Figure 5:
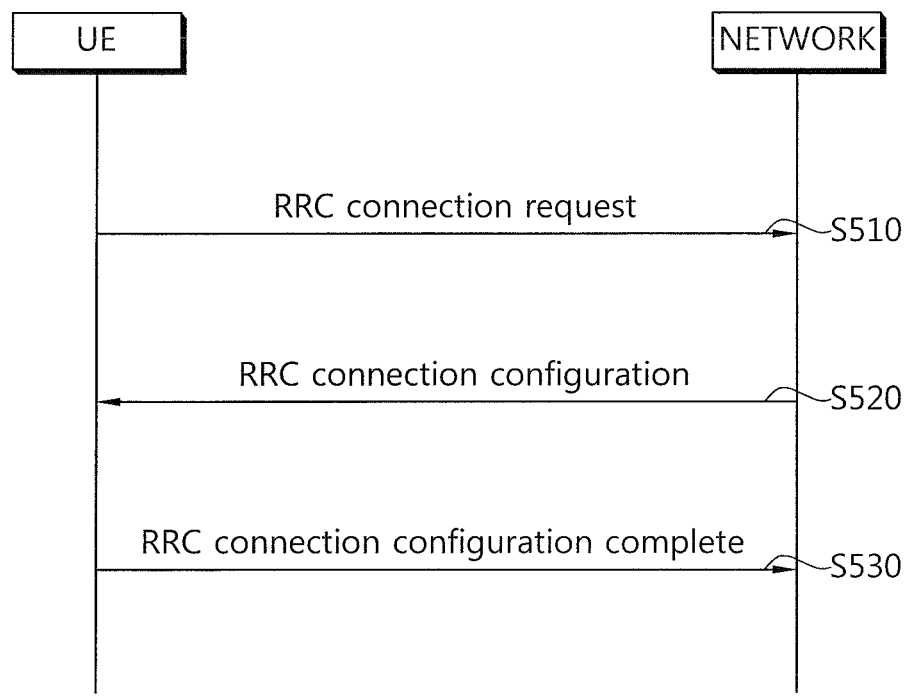
FIG. 5 is a flowchart illustrating a process of establishing RRC connection.

FIG. 5 is a flowchart illustrating a process of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
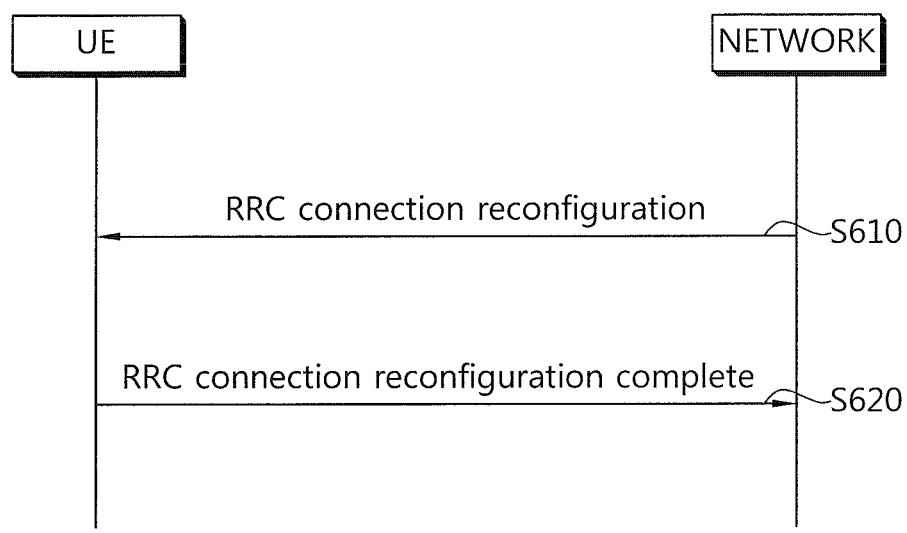
FIG. 6 is a flowchart illustrating an RRC connection reconfiguration process.

FIG. 6 is a flowchart illustrating an RRC connection reconfiguration process. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

A Public Land Mobile Network (PLMN) is described below.

The PLMN is a network deployed and managed by a mobile network operator. Each mobile network operator manages one or more PLMNs. Each PLMN may be identified by Mobile Country Code (MCC) and Mobile Network Code (MNC). Information about the PLMN of a cell is included in system information and broadcasted.

In PLMN selection, cell selection, and cell reselection, UE may take into consideration various types of PLMNs.

A Home PLMN (HPLMN): a PLMN having MCC and MNC matched with those of a UE IMSI.

An Equivalent HPLMN (EHPLMN): a PLMN equivalently treated as an HPLMN.

A Registered PLMN (RPLMN): a PLMN whose location has been successfully registered.

An Equivalent PLMN (EPLMN): a PLMN equivalently treated as an RPLMN.

Each mobile service demander joins an HPLMN. When an HPLMN or an EHPLMN provides UE with common service, the UE is not in a roaming state. In contrast, a PLMN provides UE with service in addition to an HPLMN/

EHPLMN, the UE is in a roaming state, and the PLMN is called a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

A procedure of selecting, by UE, a cell is described in detail.

When UE is powered on or camps on a cell, the UE performs procedures for selecting/reselecting a cell having proper quality and being provided with service.

UE in the RRC idle state needs to always select a cell having proper quality and to be prepared to be provided with service through the cell. For example, UE that is initially powered on needs to select a cell having proper quality in order to register it with a network. If UE in the RRC connection state enters the RRC idle state, the UE needs to select a cell on which the UE will camp in the RRC idle state. As described above, a process of selecting, by UE, a cell that satisfies some conditions in order to camp on in a service standby state, such as the RRC idle state, is called cell selection. An important point is that the cell rapidly selects a cell because cell selection is performed in the state in which the UE has not determined a cell on which the UE will camp in the RRC idle state. Accordingly, if a cell is a cell that provides the quality of a radio signal of a specific reference or higher, the cell may be selected in the cell selection process of UE although the cell is not a cell that provides the best radio signal quality to the U.

A method and procedure in which UE selects a cell in 3GPP LTE is described in detail with reference to 3GPP TS36.304 V8.5.0 (2009-03) "User Equipment (UE) procedures in idle mode (Release 8)."

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel. Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved though such a process, the UE performs an initial cell selection process.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection process is as follows First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. Cell reselection priority provided through broadcast signaling may be called common priority, and cell reselection priority set by a network for each piece of UE may be called dedicated priority. When receiving dedicated priority, UE may also receive a validity time related to the dedicated priority. When receiving the dedicated priority, the UE initiates a validity timer set as the validity time received along with the dedicated priority. While the validity timer operates, the UE applies the dedicated priority in RRC idle mode. When the validity timer expires, the UE discards the dedicated priority and applies common priority again.

For inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide UE with a cell reselection black list used in cell reselection. The UE does not perform cell reselection on a cell included in the black list.

Ranking performed in a cell reselection evaluation process is described below.

A ranking criterion used to apply priority to a cell is defined as in Equation 1.

$$R_s = Q_{meas,s} + Q_{hyst}, R_n = Q_{meas,s} - Q_{offset}$$

In this case, $R_s$ is the ranking criterion of a serving cell, $R_n$ is the ranking criterion of a neighbor cell, $Q_{meas,s}$ is the quality value of the serving cell measured by UE, $Q_{meas,n}$ is the quality value of the neighbor cell measured by UE, $Q_{hyst}$ is the hysteresis value for ranking, and $Q_{offset}$ is an offset between the two cells.

In Intra-frequency, if UE receives an offset "$Q_{offsets,n}$" between a serving cell and a neighbor cell, $O_{offset} = Q_{offsets,n}$. If UE does not $Q_{offsets,n}$, $Q_{offset} = 0$.

In Inter-frequency, if UE receives an offset "$Q_{offsets,n}$" for a corresponding cell, $Q_{offset} = Q_{offsets,n} + Q_{frequency}$. If UE does not receive "$Q_{offsets,n}$", $Q_{offset} = Q_{frequency}$.

If the ranking criterion $R_s$ of a serving cell and the ranking criterion $R_n$ of a neighbor cell are changed in a similar state, ranking priority is frequency changed as a result of the change, and UE may alternately reselect the twos. $Q_{hyst}$ is a parameter that gives hysteresis to cell reselection so that UE is prevented from to alternately reselecting two cells.

UE measures $R_s$ of a serving cell and $R_n$ of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

Radio Link Monitoring (RLM) is described below.

UE monitors downlink quality based on a cell-specific reference signal in order to detect the quality of the downlink radio link of a PCell. The UE estimates the quality of a downlink radio link in order to monitor the quality of the downlink radio link of the PCell, and compares the estimated quality with threshold values Qout and Qin. The threshold value Qout is defined as a level at which a downlink radio link is unable to be stably received, which corresponds to a block error rate of 10% of hypothetical PDCCH transmission by taking into consideration a PDFICH error. The threshold value Qin is defined as a downlink radio link quality level at which a downlink radio link is able to be more stably received than compared to the level of Qout, which corresponds to a block error rate of 2% of hypothetical PDCCH transmission by taking into consideration a PDFICH error.

A Radio Link Failure (RLF) is described below.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE A case where uplink transmission is problematic because a random access procedure continues to fail in the MAC sublayer.

A case where uplink transmission is problematic because uplink data transmission continues to fail in the RLC sublayer.

A case where handover is determined to have failed.

A case where a message received by UE does not pass through an integrity check.

An RRC connection re-establishment procedure is described in more detail below.

Figure 7:
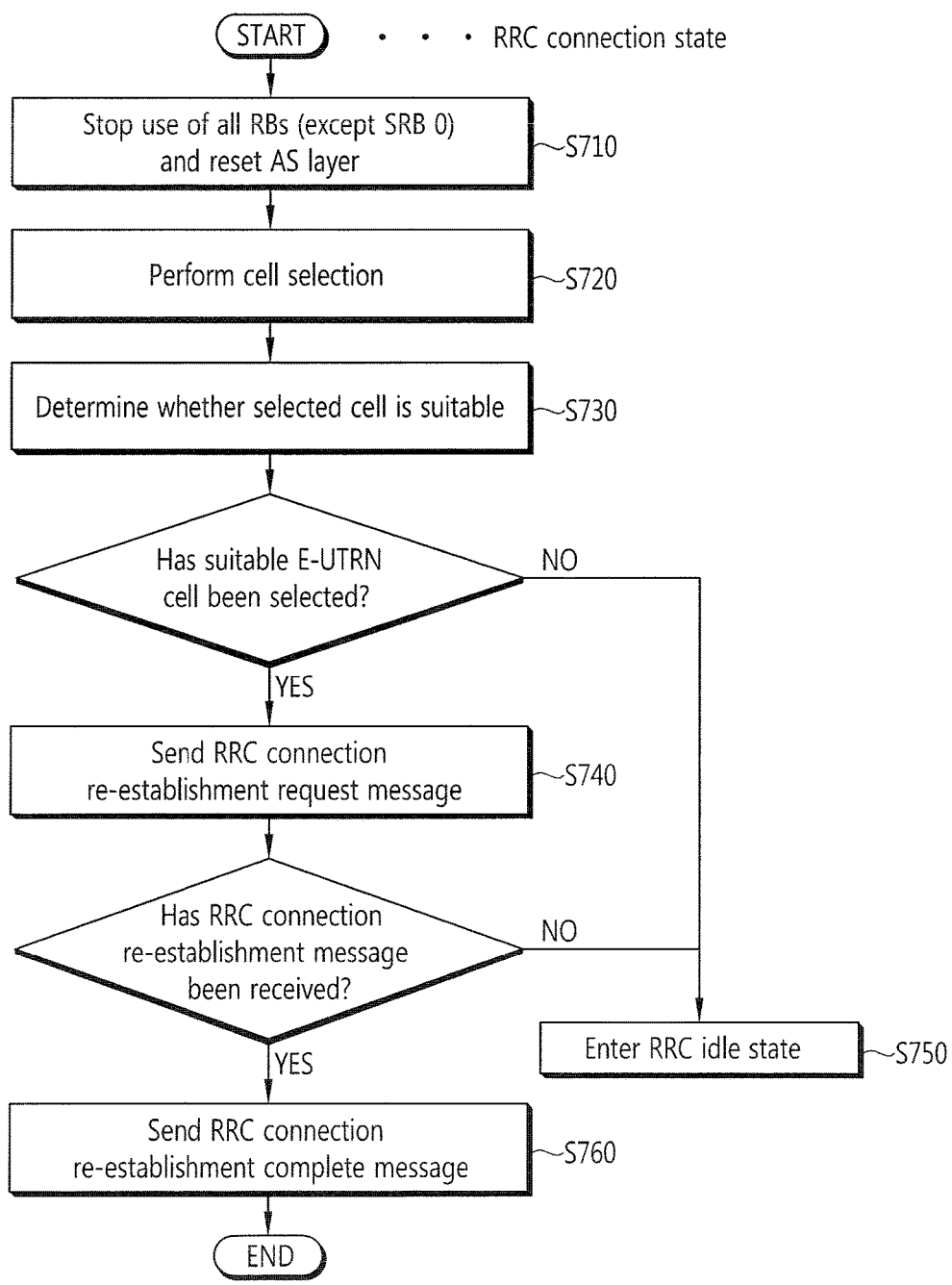
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this process, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Measurement and a measurement report are described below.

In a mobile communication system, to support the mobility of UE is essential. Accordingly, the UE continues to measure the quality of a serving cell from which the UE is now provided with service and the quality of a neighbor cell. The UE reports measured results to a network on a proper time, and the network provides optimum mobility to the UE through handover, etc. In general, measurement for this purpose is called a Radio Resource Management (RRM) measurement.

In order to provide information that may help an operator to operate a network in addition to the mobility support object, UE may perform measurement for a specific object set by the network, and may report measured results thereof to the network. For example, UE receives the broadcast information of a specific cell that has been determined by the network. The UE may report the cell identity (this is also called a global cell identity) of the specific cell, identity information about the location to which the specific cell belongs (e.g., Tracking Area Code) and/or other pieces of cell information (e.g., whether or not it is a member of a Closed Subscriber Group (CSG) cell) to the serving cell.

If UE checks that the quality of a specific area is very poor through measurement while moving, the UE may report location information and measured results for cells having poor quality to a network. A network may perform network optimization based on the reports of the measured results of UEs that help the operation of the network.

In a mobile communication system in which frequency reuse (frequency reuse factor) is 1, mobility is chiefly performed between difference cells that belong to the same frequency band. Accordingly, in order to well guarantee the mobility of UE, the UE needs to well measure the quality of neighboring cells having the same center frequency as a serving cell and information about the cells. As described above, the measurement of a cell having the same center frequency as a serving cell is called intra-frequency measurement. UE performs intra-frequency measurement and reports measured results thereof to a network on a proper time so that the object of corresponding measured results is achieved.

A mobile communication operator may operate a network using a plurality of frequency bands. If the service of a communication system is provided through a plurality of frequency bands, in order to guarantee optimum mobility for UE, the UE needs to well measure the quality of neighboring cells having center frequencies from the center frequency of a serving cell and information about the cells. As described above, the measurement of a cell having a center frequency different from the center frequency of a serving cell is called inter-frequency measurement. UE needs to be able to perform inter-frequency measurement and to report measured results thereof to a network on a proper time.

If UE supports the measurement of a heterogeneous network, the UE may measure the cell of a heterogeneous network according to a BS configuration. The measurement of such a heterogeneous network is called inter-Radio Access Technology (RAT) measurement. For example, RAT may include an UMTS Terrestrial Radio Access Network (UTRAN) and a GSM EDGE Radio Access Network (GERAN) that comply with the 3GPP standard, and may also include CDMA 2000 systems that comply with the 3GPP2 standard.

Figure 8:
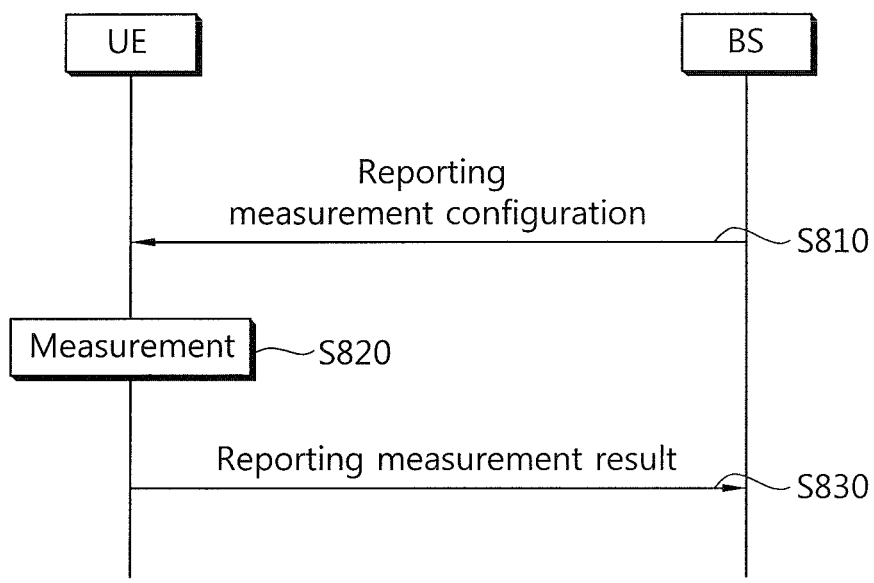
FIG. 8 is a flowchart illustrating a method of performing measurement.

FIG. 8 is a flowchart illustrating a method of performing measurement.

UE receives measurement configuration information from a BS (S810). A message including the measurement configuration information is called a measurement configuration message. The UE performs measurements based on the measurement configuration information (S820). If measured results satisfy report conditions within the measurement configuration information, the UE reports the measured results to the BS (S830). A message including the measured results is called a measurement report message.

The measurement configuration information may include the following information.

(1) Measurement object information: it is information about the object on which UE will perform measurement. A measurement object includes at least one of an intra-frequency measurement object that is the object of measurement within a cell, an inter-frequency measurement object that is the object of measurement between cells, and an inter-RAT measurement object that is the object of inter-RAT measurement. For example, the intra-frequency measurement object may indicate a neighboring cell having the same frequency band as a serving cell, the inter-frequency measurement object may indicate a neighboring cell having a frequency band different form that of a serving cell, and the inter-RAT measurement object may indicate a neighboring cell having RAT different from that of a serving cell.

(2) Reporting configuration information: this is information about a report condition regarding the time when UE reports a measured result and a report type. The report configuration information may consist of a list of report configurations. Each report configuration may include a report criterion and a report format. The report criterion is a criterion that triggers the transmission of a measured result by UE. The report criterion may be the cycle of a measurement report or a single event for a measurement report. The report format is information about that UE will configure a measured result using what type.

(3) Measurement identity information: this is information about a measurement identity that associates a measurement object with a reporting configuration so that UE determines to report what measurement object when and in what type. The measurement identity information may be included in a measurement report message and may be indicative that a measured result is about which measurement object and that a measurement report has occurred due to what report condition.

(4) Quantity configuration information: this is information about a parameter for setting the filtering of a measurement unit, a report unit and/or a measured result value.

5) Measurement gap information: this is information about a measurement gap, that is, a section that may be used for UE to perform only measurement by not taking into consideration data transmission with a serving cell because downlink transmission or uplink transmission has not been scheduled.

In order to perform a measurement procedure, UE has a measurement object list, a measurement report configuration list, and a measurement identity list.

In 3GPP LTE, a BS may configure only one measurement object for a single frequency band in relation to UE. In accordance with Paragraph 5.5.4 3GPP TS36.331 V8.5.0 (2009-03) "Evolved Universal Terrestrial Radio Access (E-UTRA) Radio Resource Control (RRC); Protocol specification (Release 8)," events that trigger measurement reports are defined in the following table.

TABLE 1

| Event | Report Conditions |
| --- | --- |
| Event A1 | Serving becomes better than threshold |
| Event A2 | Serving becomes worse than threshold |
| Event A3 | Neighbour becomes offset better than serving |
| Event A4 | Neighbour becomes better than threshold |
| Event A5 | Serving becomes worse than threshold1 and neighbour becomes better than threshold2 |
| Event B1 | Inter RAT neighbour becomes better than threshold |
| Event B2 | Serving becomes worse than threshold1 and inter RAT neighbour becomes better than threshold2 |

If the measured results of UE satisfy a set event, the UE sends a measurement report message to a BS.

Figure 9:
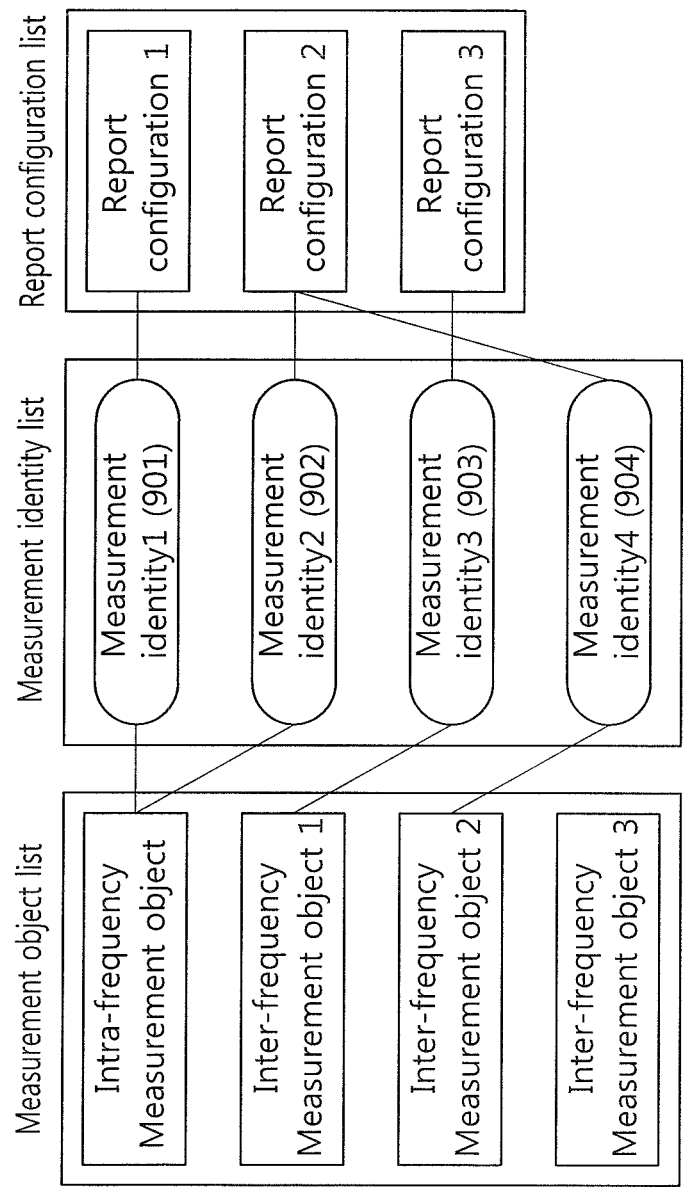
FIG. 9 illustrates an example of a measurement configuration configured to UE.

FIG. 9 illustrates an example of a measurement configuration configured to UE.

First, a measurement identity 1 901 connects an intra-frequency measurement object and a reporting configuration 1. UE performs intra-cell measurement (intra-frequency measurement), and the reporting configuration 1 is used to determine the criterion of a measurement result report and a report type.

A measurement identity 2 902 is connected to the intra-frequency measurement object like the measurement identity 1 901, but it connects the intra-frequency measurement object to a reporting configuration 2. UE performs measurement, and the reporting configuration 2 is used to determine the criterion of a measurement result report and a report type.

In accordance with the measurement identity 1 901 and the measurement identity 2 902, UE sends the measured results of the intra-frequency measurement object although the measured results satisfy any one of the reporting configuration 1 and the reporting configuration 2.

A measurement identity 3 903 connects an inter-frequency measurement object 1 and a reporting configuration 3. UE reports the measured results of the inter-frequency measurement object 1 if the measured results satisfy report conditions included in the reporting configuration 1.

A measurement identity 4 904 connects an inter-frequency measurement object 2 and the reporting configuration 2. UE reports the measured results of the inter-frequency measurement object 2 if the measured results satisfy report conditions included in the reporting configuration 2.

Meanwhile, a measurement object, a reporting configuration and/or a measurement identity may be added, changed and/or deleted. This may be indicated in such a manner that a BS sends a new measurement configuration message to UE or sends a measurement configuration change message to the UE.

Figure 10:
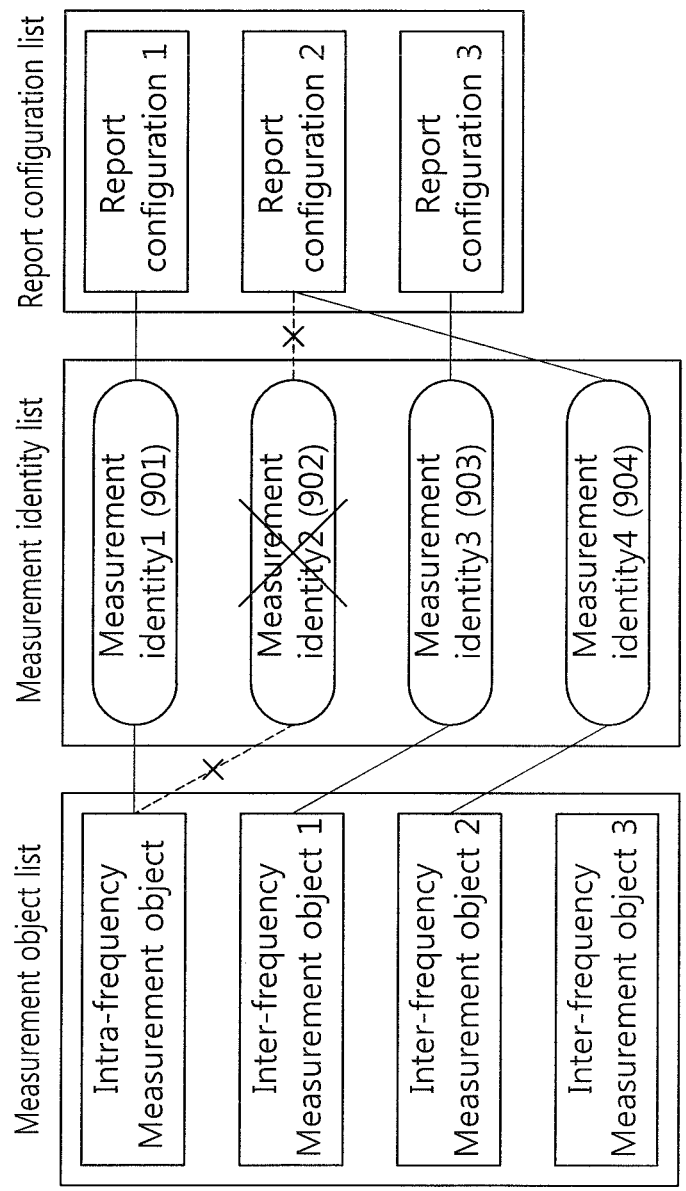
FIG. 10 illustrates an example in which a measurement identity is deleted.

FIG. 10 illustrates an example in which a measurement identity is deleted. When a measurement identity 2 902 is deleted, the measurement of a measurement object associated with the measurement identity 2 902 is stopped, and a measurement report is not transmitted. A measurement object or a reporting configuration associated with a measurement identity may not be changed.

Figure 11:
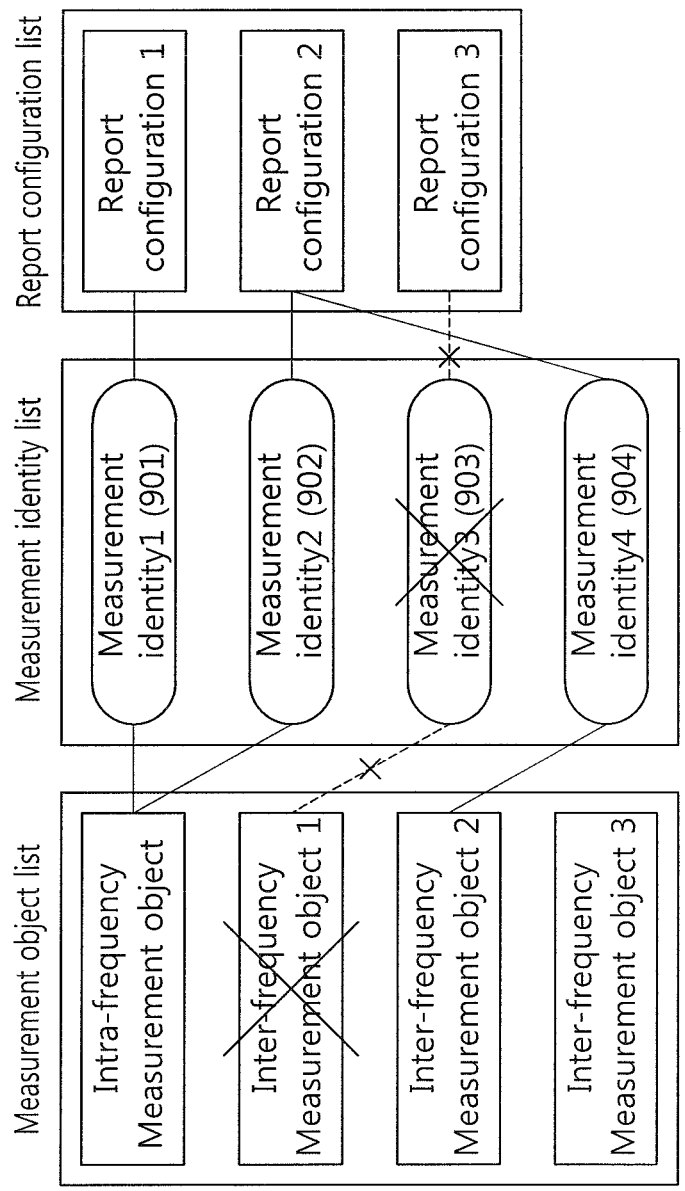
FIG. 11 illustrates an example in which a measurement object is deleted.

FIG. 11 illustrates an example in which a measurement object is deleted. When an inter-frequency measurement object 1 is deleted, UE also deletes an associated measurement identity 3 903. The measurement of the inter-frequency measurement object 1 is stopped, and a measurement report is not transmitted. However, a reporting configuration associated with the deleted inter-frequency measurement object 1 may not be changed or deleted.

When a reporting configuration is removed, UE also removes an associated measurement identity. The UE stops the measurement of a measurement object associated by the associated measurement identity. However, a measurement object associated with a deleted reporting configuration may not be changed or deleted.

A measurement report may include a measurement identity, the measured quality of a serving cell, and the measured results of a neighboring cell. A measurement identity identifies a measurement object whose measurement report has been triggered. The measured results of a neighboring cell may include the cell identity and measured quality of the neighboring cell. Measured quality may include at least one of Reference Signal Received Power (RSRP) and Reference Signal Received Quality (RSRQ).

A Tacking Collection Entity (TCE) is described below.

A subscriber and equipment traces very detailed information to one or more specific mobiles in terms of a call level. The data may be an additional source for information for performance measurements. Furthermore, the data enables a further deep monitoring and optimization operation to be performed. Unlike in a performance measurement that is always the source of information, the trace may be activated in response to user needs/requirements during a limited time interval for a specific analysis purpose. The trace plays a very important role in operations, such as determining a fundamental cause of a malfunctioning mobile, an improved troubleshoot, the optimization the use of resource and quality, control of Radio Frequency (RF) coverage, capacity improvements, an analysis of a break-up phenomenon during a call, and the check of an UMTS procedure between the ends of a core network and an UTRAN.

For service initiated by a specific user (e.g., an International Mobile Subscriber Identity (IMSI)), a mobile type (e.g., an International Mobile Equipment Identity (IMEI) Software Version (IMEISV)), or a user, a function for logging data on an interface in a call level enables information that may not be inferred from performance measurements, such the recognition of the final user QoS during a call (e.g., requested QoS versus provided QoS), a correlation between protocol messages and RF measurements, or mutual information processing operation with specific mobile vendors, to be obtained. Trace data is collected by the TCE.

A Minimization of Drive-Tests (MDT) procedure is described below.

The MDT procedure enables a UE to perform measurements and to report the results of the measurement instead of a drive test in which conventional operators measure the quality of cells using vehicles for the coverage optimization of the cells. Coverage varies depending on the location of a BS, the deployment of surrounding buildings, and an environment used by a user. Accordingly, an operator needs to periodically perform a drive test, which requires great expense and lots of resources. In order to overcome such a disadvantage, there is proposed an MDT procedure in which an operator measures coverage using UE.

An operator may synthesize MDT measurement values received from multiple UEs, may write a coverage map indicative whether service is available in an overall area in which an operator provides the service and a distribution of qualities of service, and may use the coverage map in network operations and optimization. For example, when a coverage problem in a specific area is reported by UE, an operator may extend the coverage of a cell in the corresponding area by increasing the transmission power of a BS that provides service in the corresponding area. The time and expense for network optimization can be minimized through such as method.

The MDT has been made based on the framework of a trace function, that is, one of the tools of an operator for Operation, Administration, and Maintenance (OAM). The trace function provides an operator with the ability to perform trace and log the behaviors of UE, and thus it may enable a main cause of a defective function on the UE side to be determined. Traced data is collected over a network, and is called a Trace Collection Entity (TCE). An operator uses data collected by a TCE for analysis and evaluation purposes. A trace function used for an MDT includes signaling based on the trace function and management based on trace functions. Signaling based on a trace function is used to activate an MDT task toward specific UE, whereas management based on trace functions is used to activate an MDT task without being limited to specific UE.

An MDT may be divided into two types: a logged MDT and an immediate MDT depending on whether UE reports measured and stored log data in a real-time manner or in real time. The logged MDT is a method by which UE performs MDT measurements, logs measurement data, and subsequently sends the logged data to a network. In contrast, the immediate MDT is a method by which UE performs MDT measurements and immediately sends measurement data to a network. In accordance with the logged MDT, UE may perform MDT measurements in the RRC idle state. In accordance with the immediate MDT, UE performs MDT measurements in the RRC connection state.

Figure 12:
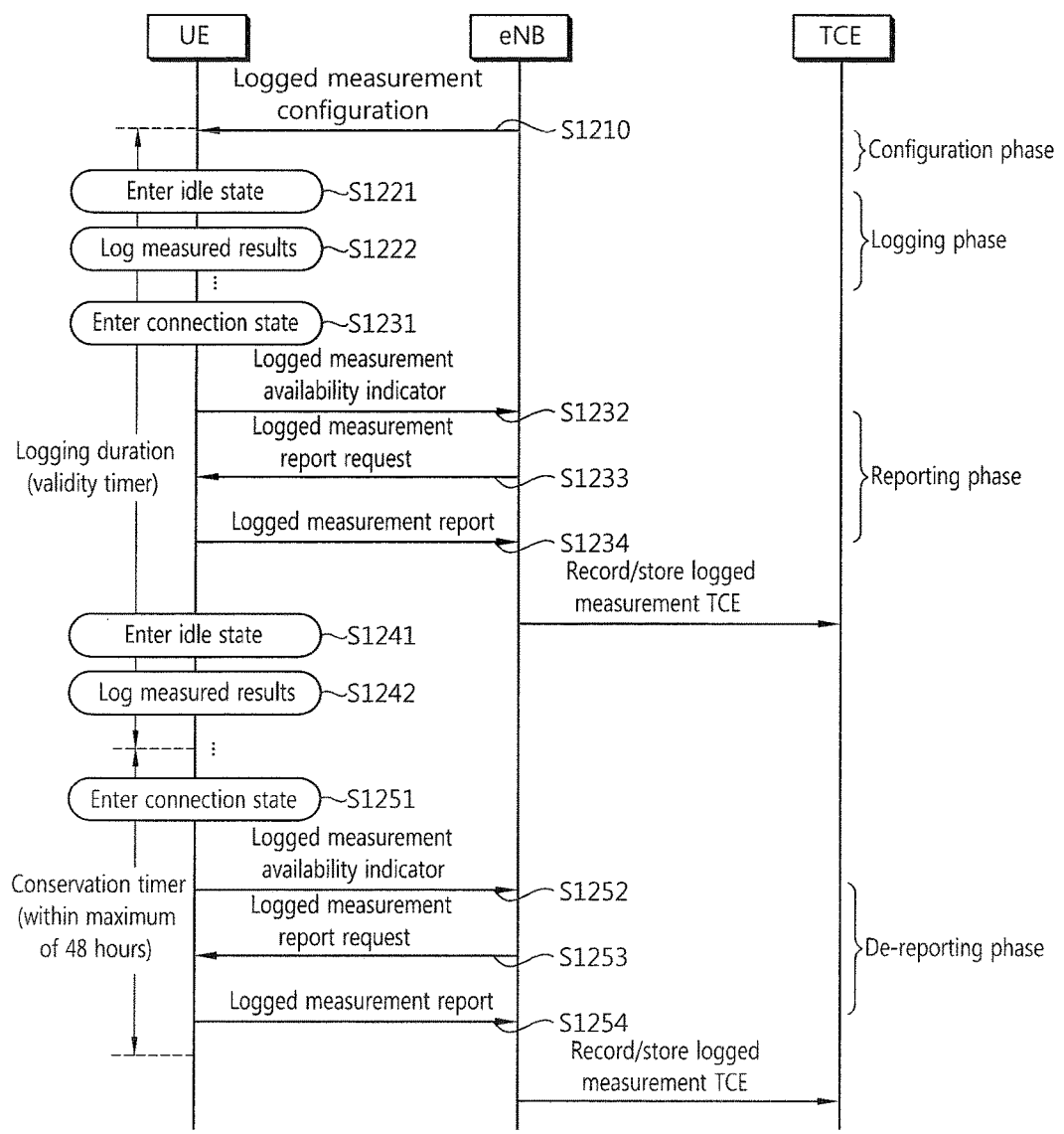
FIG. 12 is a flowchart illustrating a method of performing a logged MDT.

FIG. 12 is a flowchart illustrating a method of performing a logged MDT.

Referring to FIG. 12, UE receives a logged measurement configuration (S1210). The logged measurement configuration may be included in an RRC message, and may be transmitted through a downlink control channel. The logged measurement configuration may include at least one of the ID of a TCE, information about the time that is a reference on which logging is performed (i.e., a reference time), logging duration, a logging interval, and information about an area configuration. The logging interval is indicative of an interval in which measured results are stored. The logging duration is indicative of duration for which UE performs a logged MDT. The reference time is indicative of the time that is the reference of duration for which a logged MDT is performed. The area configuration is indicative of an area on which the execution of logging has been requested by UE.

Meanwhile, the UE starts a validity timer when receiving the logged measurement configuration. The validity timer is indicative of the lifespan of the logged measurement configuration, and may be specified based on information about logging duration. The duration of the validity timer may be indicative of the validity of measured results owned by the UE in addition to the valid lifespan of the logged measurement configuration.

As described above, a procedure in which the UE performs the logged measurement configuration and a corresponding overall procedure is performed is called a configuration phase.

When the UE enters the RRC idle state (S1221), the UE logs measured results while the validity timer operates (S1222). The value of the measured results may be RSRP, RSRQ, Received Signal Code Power (RSCP), or Ec/No. Information on which the measured results have been logged is hereinafter called logged measurement and/or a measurement result log. A temporal section in which UE logs measured results at least more than once is called a logging phase.

To perform the logged MDT based on the logged measurement configuration by the UE may vary depending on the location where the UE is present.

Figure 13:
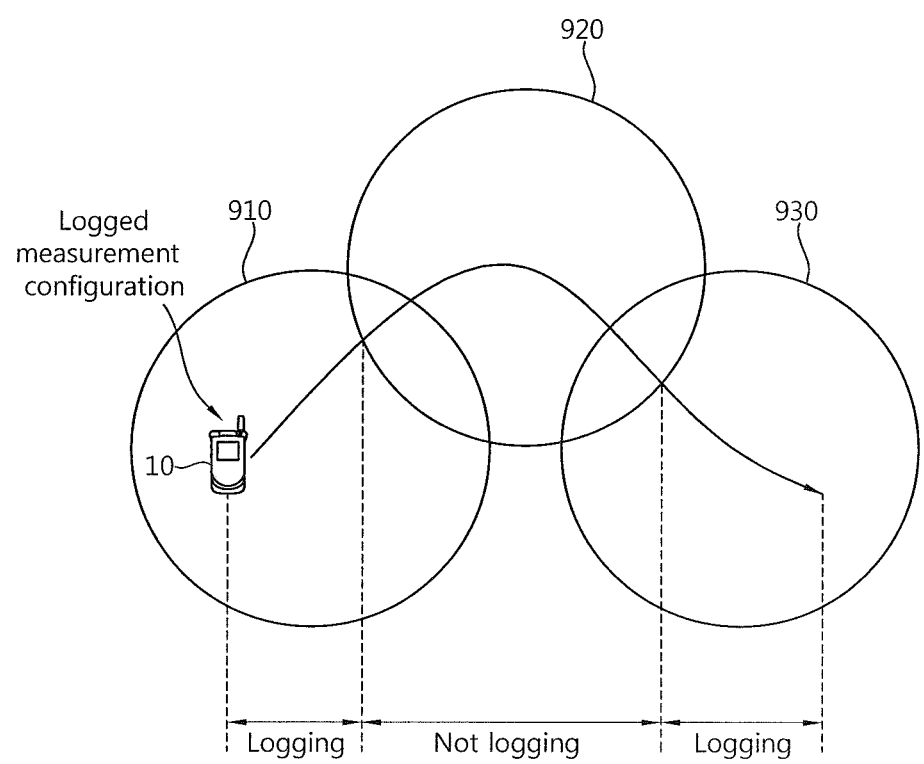
FIG. 13 is a diagram illustrating an example of a logged MDT according to a logged area.

FIG. 13 is a diagram illustrating an example of a logged MDT according to a logged area.

A network may configure a logging area, that is, an area on which UE has to log. The logging area may be expressed as a cell list, or may be expressed as a tracking area/location area list. If a logging area is configured or UE, the UE stops logging if it deviates from the logging area.

Referring to FIG. 13, a first area 1310 and a third area 1330 are areas configured as logging areas, and a second area 1320 is an area in which logging is not permitted. UE performs logging in the first area 1310, but does not perform logging in the second area 1320. The UE perform logging again when it moves from the second area 1320 to the third area 1330.

Figure 14:
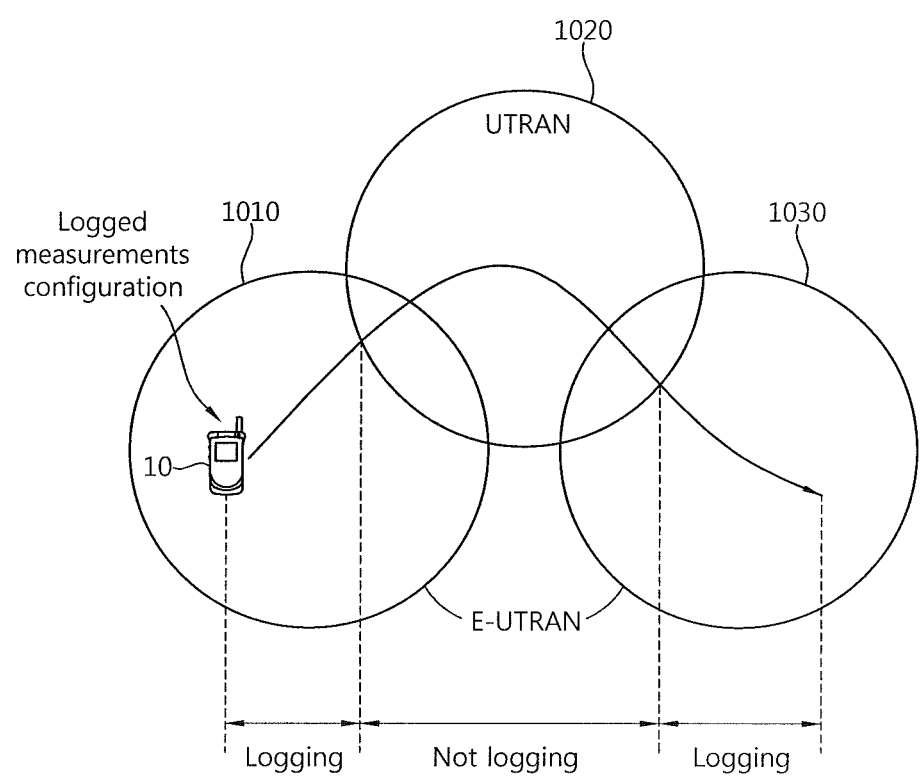
FIG. 14 is a diagram illustrating an example of a logged MDT according to a change of RAT.

FIG. 14 is a diagram illustrating an example of a logged MDT according to a change of RAT.

UE performs logging only when it camps on RAT from which a logged measurement configuration has been received, but stops logging in other RATs. In this case, the UE may log cell information for other RATs in addition to the RAT on which the UE camps.

A first area 1410 and a third area 1430 are E-UTRAN areas, and a second area 1420 is an UTRAN area. A logged measurement configuration is received from the E-UTRAN. UE does not perform MDT measurement when it enters the second area 1420.

Referring back to FIG. 12, the UE enters the RRC connection state (S1231). If logged measurement to be reported is present, the UE informs an eNB that the logged measurement to be reported is present (S1232). The UE may inform the eNB that the logged measurement to be reported is present when RRC connection is established, RRC connection is re-established, or RRC connection is reconfigured. Furthermore, if the UE performs handover, the UE may inform the eNB that logged measurement for a handover target cell is present. To inform, by the UE, the eNB that the logged measurement is present may include including a logged measurement-available indicator, that is, indication information that provides notification of the presence of the logged measurement, in an RRC message transmitted from the UE to the eNB, and sending the RRC message including the logged measurement-available indicator. The RRC message may be an RRC connection establishment complete message, an RRC connection re-establishment complete message, an RRC reconfiguration complete message, or a handover complete message.

When a signal that provides notification of the presence of the logged measurement is received from the UE, the eNB requests the UE to report the logged measurement (S1233). To request the logged measurement to be reported may include including a logged measurement report request parameter regarding information indicative of the request in an RRC message, and sending the RRC message including the logged measurement report request parameter. The RRC message may be a UE information request message.

When the UE receives the request to report the logged measurement from the eNB, the UE reports the logged measurement to the eNB (S1234). To report the logged measurement to the eNB may include including a logged measurement report, including the logged measurement, in an RRC message, and sending the RRC message to the eNB. The RRC message may be a UE information report message. In reporting the logged measurement, the UE may report all the logged measurements of the UE at a report time point to the eNB, or may report some of all the logged measurements to the eNB. If some of the logged measurements are reported, the reported some measurements may be discarded.

A phase in which a process of informing, by the UE, the eNB that the logged measurement is present, receiving the request to report the logged measurement from the eNB, and reporting the logged measurement in response to the request is performed as described above is called a reporting phase.

While the logged MDT is performed, the UE chiefly measures a wireless environment. The MDT measurement may include the identity of a cell and the signal quality and/or signal intensity of the cell. The MDT measurement may include a measurement time and a measurement place. The following table illustrates contents logged by UE. A Tacking Collection Entity (TCE) is described below.

TABLE 2

| Parameter (set) | Description |
| --- | --- |
| Serving cell identity | Global cell identity of serving cell |
| Measured results of serving cell | Measured RSRP of serving cell<br>Measured RSRQ of serving cell |
| Measured results of neighbor cell | Cell identities of measured E-UTRA cells, measured results of E-UTRA cells<br>Cell identities of measured UTRA cells, measured results of UTRA cells<br>Cell identities of measured GERAN cells, measured results of GERAN cells |

TABLE 2-continued

| Parameter (set) | Description |
| --- | --- |
| | Cell identities of measured CDMA 2000 cells, measured results of CDMA 2000 cells |
| Time stamp | The moment of logging measurement results, calculated (as current time minus absoluteTimeStamp in seconds) |
| Location information | Detailed location information at the moment of logging |

Pieces of information logged at different logging time points may be stored as follows so that they are classified as different log entries.

Figure 15:
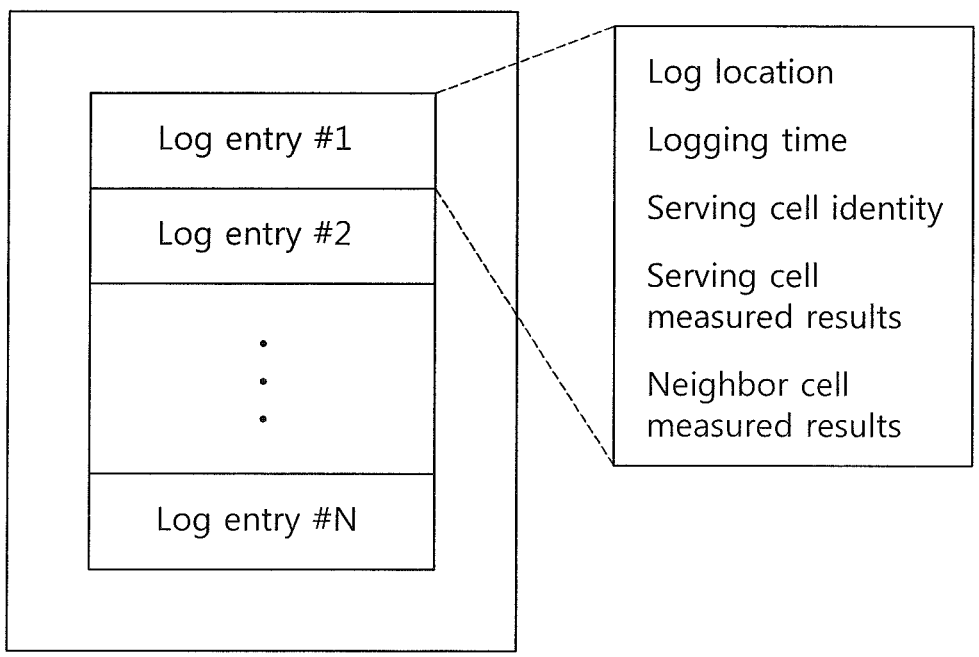
FIG. 15 is a diagram illustrating an example of logged measurements.

FIG. 15 is a diagram illustrating an example of logged measurements.

Logged measurement includes one or more log entries.

The log entry includes a logging location, a logging time, a serving cell identity, the measured results of a serving cell, and the measured results of a neighboring cell.

The logging location is indicative of the location where UE was measured. The logging time is indicative of the time when UE was measured. Pieces of information logged at different logging times are stored in different log entries.

The serving cell identity may include a cell identity in Layer 3, which is called a Global Cell Identity (GCI). The GCI is a set of a Physical Cell Identity (PCI) and a PLMN identity.

Meanwhile, UE may analyze indices related to the performance of the UE in addition to a wireless environment, and log the analyzed indices. For example, the indices may include throughput, an erroneous transmission/reception rate, etc.

Referring back to FIG. 12, the logging phase and the reporting phase may be present in logging duration plural times (S1241, S1242).

When logged measurement is reported, the eNB may record/store the logged measurement in the TCE.

After the validity timer expires, that is, after the logging duration elapses, if the UE has logged measurement that has not yet been reported, the UE performs a procedure for reporting the logged measurement to the eNB. A phase in which an overall procedure for reporting the logged measurement is called a post-reporting phase.

After the logging duration is terminated, the UE discards the logged measurement configuration and starts a conservation timer. After the logging duration is terminated, the UE stops MDT measurement. However, already logged measurement remains without being discarded. The conservation timer is indicative of the lifespan of the remaining logged measurement.

When the UE enters the RRC connection state before the conservation timer expires (S1251), the UE may report not-reported logged measurement to the eNB. In such a case, the aforementioned procedure for a logged measurement report may be performed (S1252, S1253, and S1254). If the conservation timer expires, the remaining logged measurement may be discarded. When logged measurement is reported, the eNB may record/store the logged measurement in the TCE.

The conservation timer may be fixed to a value predetermined in the UE, and may be previously set in the UE. For example, the value of the conservation timer may be 48 hours. Alternatively, the value of the conservation timer may be included in a logged measurement configuration and transferred to the UE, or may be included in another RRC message and transferred to the UE.

Meanwhile, when a new logged measurement configuration is transferred to the UE, the UE may update an existing logged measurement configuration with a newly obtained logged measurement configuration. In such a case, the validity timer may be started again from a time point at which a logged measurement configuration is newly received. Furthermore, logged measurement based on a previous logged measurement configuration may be discarded.

Figure 16:
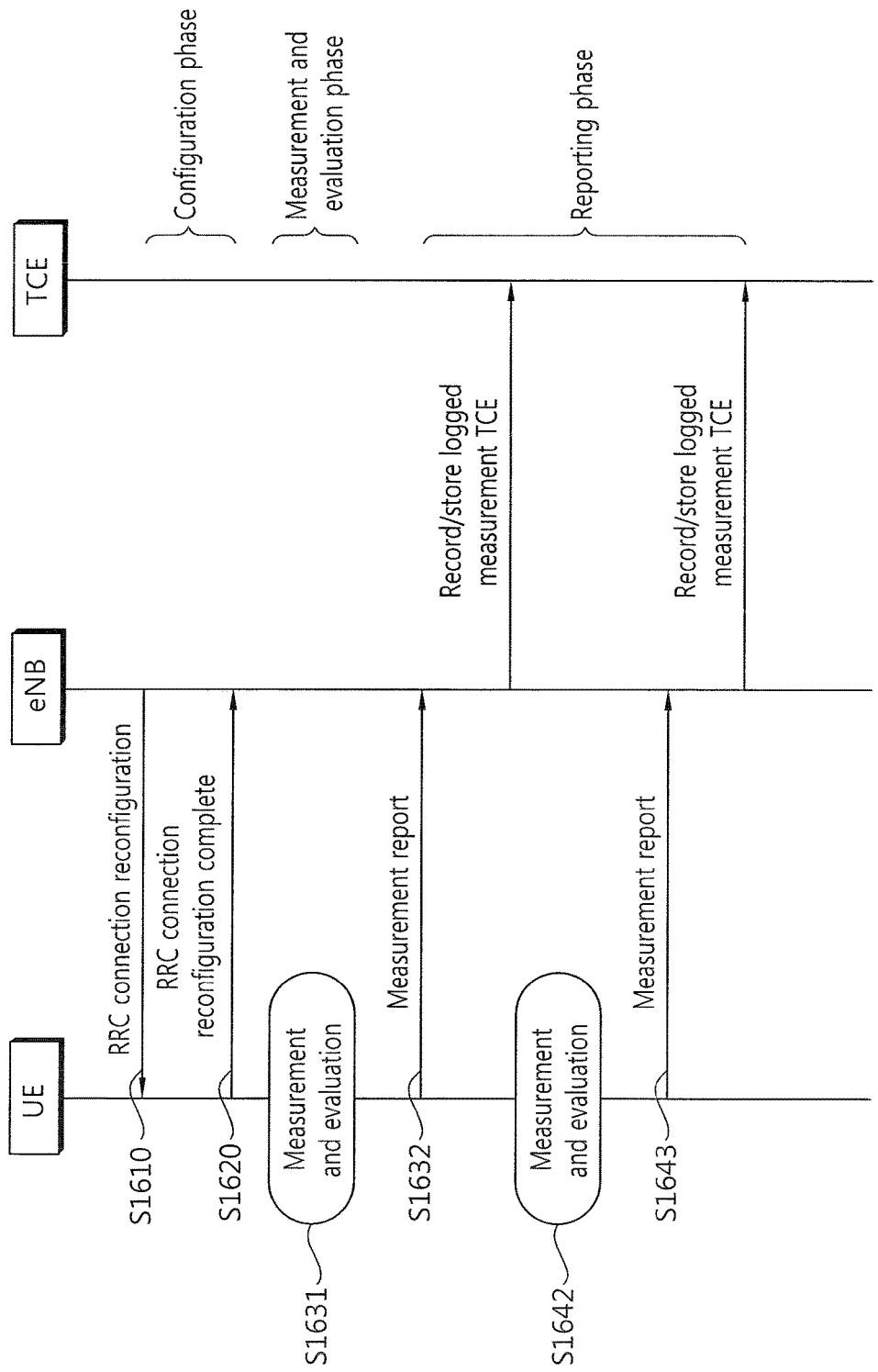
FIG. 16 is a diagram illustrating an example of an immediate MDT.

FIG. 16 is a diagram illustrating an example of an immediate MDT. The immediate MDT is based on a Radio Resource Management (RRM) measurement and report mechanism. When a measurement report is made, information related to the location is additionally added to the immediate MDT and reported to an eNB.

Referring to FIG. 16, UE receives an RRC connection reconfiguration message (S1610), and sends an RRC connection reconfiguration complete message (S1620). Accordingly, the UE enters the RRC connection state. The UE may receive a measurement configuration by receiving the RRC connection reconfiguration message. In the example of FIG. 16, the measurement configuration is received through the RRC connection reconfiguration message, but may be included in another RRC message and transmitted.

The UE performs measurement and evaluation in the RRC connection state (S1631), and reports measured results to an eNB (S1632). In the immediate MDT, the measured results may provide precise location information as in the example of Global Navigation Satellite System (GNSS) location information if possible. For location measurement, such as fingerprint, the measured results may provide neighbor cell measurement information that may be used to determine the location of the UE.

From FIG. 16, it may be seen that even after the measurement and evaluation (S1631) and report (S1632) that are first performed, the UE reports the measured results to the eNB (S1643) right after performing measurement and evaluation (S1642). This is the greatest difference between the logged MDT and the immediate MDT.

A report on an RLF is described below.

When an RLF occurs or a handover failure occurs, UE reports such a failure event to a network in order to support the Mobility Robustness Optimization (MRO) of the network.

After RRC connection re-establishment, the UE may provide the RLF report to an eNB. Wireless measurement includes in the RLF report may be used for a potential reason of a failure in order to identify coverage problems. Such information may be used to borrow such events as input to other algorithms by excluding the events in MRO evaluation for an intra-LTE mobility connection failure.

If RRC connection re-establishment fails or UE does not perform RRC connection re-establishment, the UE may be connected again in idle mode, and may generate a valid RLF report on an eNB. For such an object, the UE may store information related to the most recent RLF or handover failure, and may inform an LTE cell that an RLF report is valid every RRC connection (re)establishment and handover until the RLF report is fetched by a network or for 48 hours after an RLF or handover failure is detected.

The UE maintains the information for a state shift and a change of an RAT, and indicates that the RLF report is valid again after returning back to an LTE RAT.

In an RRC connection establishment procedure, the validity of an RLF report means that UE has experienced an obstruction, such as a connection failure, and the RLF report attributable to the failure has not yet been transferred to a network. The RLF report from the UE includes the following information.

If the last cell (in the case of an RLF) that has provided service to the UE or the E-CGI of a target for handover has not been known, a PCI and frequency information are used instead.

The E-CGI of a cell at which re-establishment has been attempted.

When initializing the last handover, for example, when a message 7 (an RRC connection reconfiguration) is received by the UE, the E-CGI of a cell that has provided service to the UE.

The time that has elapsed from the initialization of the last handover to a connection failure.

Information indicative of whether the connection failure is attributable to an RLF or a handover failure.

Wireless measurement.

A failure location.

The eNB that has received the RLF from the UE may forward the report to an eNB that had provided service to the UE prior to the reported connection failure. Wireless measurement included in the RLF report may be used to identify coverage issues as a potential cause of an RLF. Such information may be used to send events to another algorithm as input again by excluding the events from the MRO evaluation of an intra-LTE mobility connection failure. The RLF report may be taken into consideration as part of an MDT.

Accessibility measurement is described below.

To handle the non-availability measurement of connection for UE includes many aspects. In this case, both common channels and connection procedures are handled. In order to notify a network of the non-availability of connection and thus to help parameter optimization for increasing the validity of connection, UE performs accessibility measurement when a connection establishment failure occurs. For the accessibility measurement, the UE performs the following logging.

A time stamp induced using a relative timer that counts time between a failure and a report is included. A storage time for accessibility measurement is 48 hours.

To report the number of transmitted random access preambles is supported.

To indicate whether a maximum power level has been reached is included.

To indicate whether a contention has been detected during a random access procedure for connection establishment is included.

Accessibility measurement may be taken into consideration as part of an MDT.

In-Device Coexistence (IDC) is described below.

In order for a user to access various network anywhere and at any time, one UE may be equipped with a Global Navigation Satellite System (GNSS) receiver in addition to transceivers for wireless communication systems, such as LTE, Wi-Fi, and Bluetooth (BT). For example, there may be UE on which LTE and BT modules have been mounted in order to receive VoIP service and multimedia service using BT equipment, UE on which LTE and Wi-Fi modules have been mounted for a traffic distribution, and UE on which a GNSS and an LTE module have been mounted in order to additionally obtain location information.

In this case, since some transceivers are closely placed within the single UE, the intensity of power transmitted by one transmitter may be greater than the reception power of another receiver. The occurrence of interference (IDC interference) between two transceivers can be prevented by placing a gap in a filter technology or an available frequency. However, if some wireless communication modules operate in adjacent frequencies within one UE, interference cannot be sufficiently removed by a current filter technology. The problem needs to be solved for the coexistence of transceivers for a plurality of wireless communication modules within UE in the future.

Figure 17:
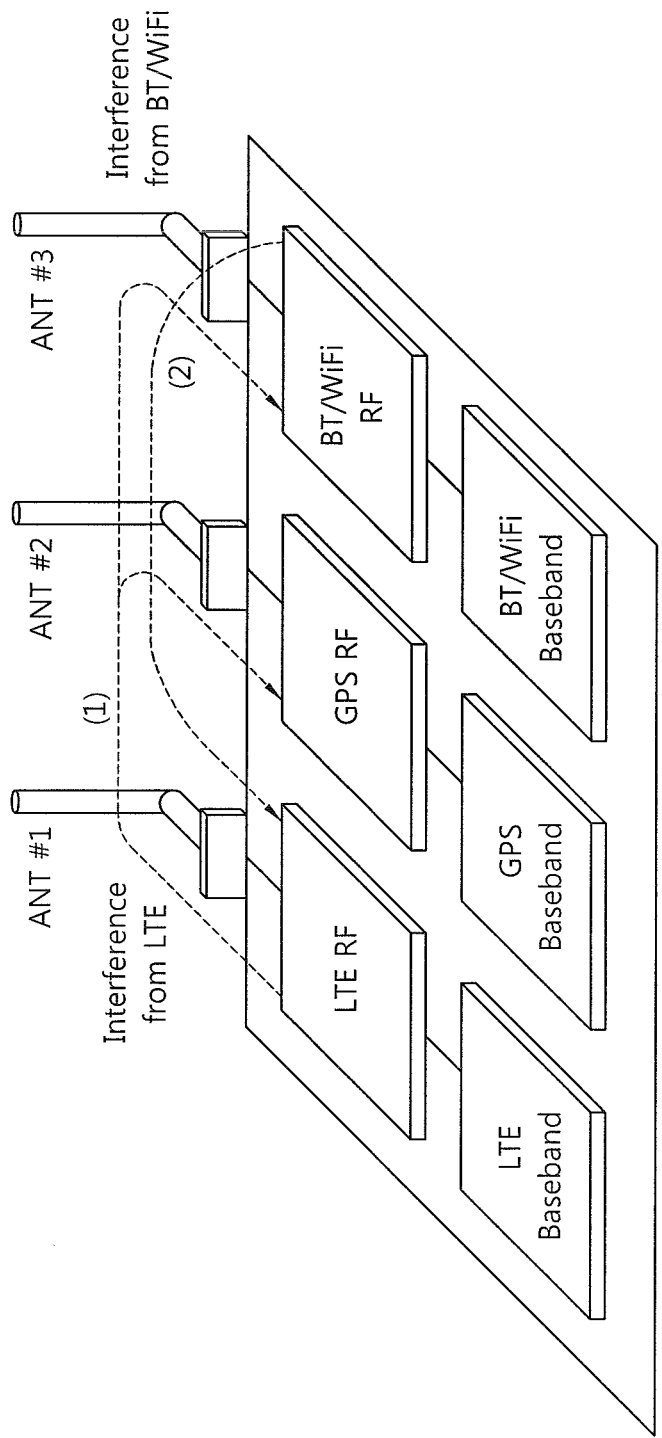
FIG. 17 illustrates the state in which mutual interference may be generated in an IDC environment in which LTE, GPS, and BT/Wi-Fi coexist within one UE.

FIG. 17 illustrates the state in which mutual interference may be generated in an IDC environment in which LTE, GPS, and BT/Wi-Fi coexist within one UE.

IDC interference avoidance is basically divided into three modes depending on whether there is coordination with another communication module that coexists with an LTE module and whether there is coordination between an LTE module and an eNodeB in order to solve IDC interference. The first mode is a mode in which coordination for IDC interference avoidance does not exist between coexistent communication modules and between an LTE module and a network. In this case, the LTE module may not properly process the deterioration of service quality attributable to IDC interference because it is unaware of information about another coexistent communication module. The second mode is a case where there is coordination between coexistent communication modules within UE. In this mode, coexisting modules may be aware of the on/off state, traffic transmission state, etc. of a counterpart module. However, there is no coordination between the UE and the network. The last mode is a mode in which there is coordination between coexistent modules within UE and coordination between the UE and a network. In this mode, the coexistent module may be aware of the on/off state, traffic transmission state, etc. of a counterpart module. Furthermore, the UE notifies the network of an IDC interference state so that the network makes a determination for avoiding IDC interference and takes measures.

As described above, an LTE module can perform coordination with another module within UE and also measure IDC interference through inter/intra frequency measurement.

Interference may be IDC interference occurring because different communication modules coexist within one UE. Such IDC interference may be generated in the following coexistence situations.

Interference occurs in the state in which LTE and Wi-Fi coexist.

Interference occurs in the state in which LTE and BT coexist.

Interference occurs in the state in which LTE and a GNSS coexist.

Communication modules can operate in a neighboring frequency as follows in terms of the frequency in order to reduce mutual interference.

LTE TDD may operate in Band 40 (2300 MHz~2400 MHz), and Wi-Fi, BT may operate in an unlicensed band (2400 MHz~2483.5 MHz). In this case, the transmission of LTE may give interference to Wi-Fi, BT, and the transmission of Wi-Fi or BT may give interference to the reception of LTE.

LTE FDD may perform up transmission in Band 7 (2500 MHz-2700 MHz), and Wi-Fi, Bluetooth may operate in the unlicensed band (2400 MHz~2483.5 MHz). In this case, the up transmission of LTE may give interference to the reception of Wi-Fi or Bluetooth.

LTE FDD may perform up transmission in Band 13 (UL: 777-787 MHz, DL: 746-756 MHz) or Band 14 (UL: 788-798 MHz, DL: 758-768 MHz), and GPS radio may perform reception in 1575.42 MHz. In this case, the up transmission of LTE may give influence to the reception of GPS.

In current 3GPP, in order to solve IDC interference, two directions are basically taken into consideration. The first direction is a method in which a communication module that gives interference or a communication module that is subject to interference changes a frequency (Frequency Division Multiplexing (FDM)). The second direction is a method in which a coexistent communication module partitions a single frequency according to time and uses the frequencies (Time Division Multiplexing (TDM)).

If internal interference, that is, IDC interference, is detected between an LET device within UE and another ISM band device within the UE is detected, the UE may send an IDC indicator to a network. The IDC indicator may indicate that the UE has experienced IDC interference. The IDC indicator may include information about a specific frequency and/or a time interval pattern. In this case, the information about a specific frequency may become a base in performing FDM in order to solve an IDC interference problem. The information about a specific time interval pattern may become a base in performing TDM. The information about a specific frequency may indicate a frequency in which IDC interference has occurred. The information about a specific time interval pattern may indicate a time interval in which IDC interference has occurred due to the operation of another ISM band device.

If a network provides UE with a parameter related to wideband measurement, the UE may perform wideband measurement. In reporting a measurement result obtained by the UE to the network, signaling regarding that a reported measurement result has been obtained based on what measurement is not provided. Accordingly, the network may be aware whether the measurement result has been obtained through wideband measurement or has been obtained through narrowband measurement.

For example, when UE capable of wideband measurement performs measurement and logging while passing through several serving cell by executing logged measurement, the UE may perform wideband measurement for more accurate measurement in a serving cell in which the wideband measurement is possible and may perform narrowband measurement in a serving cell in which the wideband measurement is impossible. However, when the UE performs logging on the measurement result, the network is unaware whether the measurement result of a log entry is a result according to wideband measurement or narrowband measurement because the UE does not perform logging on information about the measurement bandwidth. As a result, the network may perform inefficient network optimization through an inaccurate analysis of the reported logged measurement.

In order to prevent a problem that may occur as described above and provide more efficient and accurate network optimization and service, a supplemented method of reporting measurement needs to be proposed.

The present invention proposes a method of reporting both a measurement result and related measurement bandwidth information to a network in reporting the measurement result of UE to the network.

Figure 18:
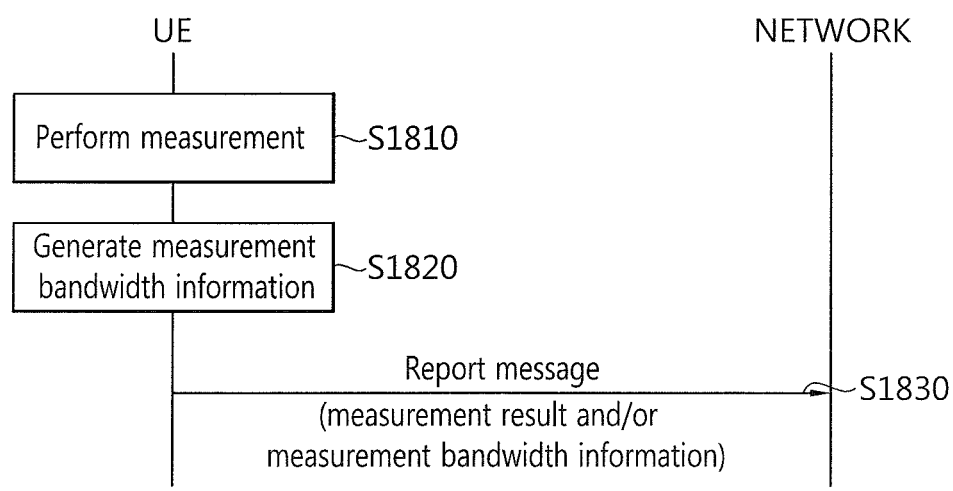
FIG. 18 is a diagram illustrating a method of reporting measurement in accordance with an embodiment of the present invention.

FIG. 18 is a diagram illustrating a method of reporting measurement in accordance with an embodiment of the present invention.

Referring to FIG. 18, UE obtains a measurement result by performing measurement (S1810).

The execution of the measurement of the UE may include performing the measurement according to a measurement configuration provided by a network.

The execution of the measurement of the UE may include performing the measurement for a logged MDT according to a logged measurement configuration provided by a network. Accordingly, the UE may obtain a measurement result for each logging interval.

In each case, the measurement of the UE may be RSRQ measurement for a cell or RSRP measurement for the cell. The obtained measurement result may be measurement in which an interference signal has been taken into consideration in order to determine quality of a measured cell.

The UE generates measurement bandwidth information (S1820). The measurement bandwidth information generated by the UE may be generated in relation to the obtained measurement result.

The measurement bandwidth information may indicate whether the related measurement result has been obtained through wideband measurement or has been obtained through narrowband measurement. In this case, whether the related measurement result is wideband or narrowband measurement may differ depending on whether the measurement bandwidth exceeds a specific threshold bandwidth. If the measurement bandwidth exceeds a specific threshold bandwidth, the measurement performed by the UE may be wideband measurement. If the measurement bandwidth does not exceed the specific threshold bandwidth, the measurement performed by the UE may be narrowband measurement. A threshold bandwidth may be specified as the number of radio resources. For example, in the threshold bandwidth, a bandwidth corresponding to 6 resource blocks may be defined. Information about the threshold bandwidth may be signaled from the network to the UE and may have been previously signaled in the UE.

A configuration may be performed so that a report itself on measurement bandwidth information along with a related measurement result is construed as being a measurement result obtained through wideband measurement. That is, when the measurement result is reported to a network, if the measurement bandwidth information is not reported, the corresponding measurement result may be construed as having been obtained through narrowband measurement. On the contrary, when the measurement result is reported to the network, if it is reported along with the measurement bandwidth information, the corresponding measurement result may be construed as having been obtained through wideband measurement.

The measurement bandwidth information may indicate the measurement result and the value of the related measurement bandwidth. In this case, the value of the measurement bandwidth may be defined as the number of resource blocks. Whether the measurement result has been obtained based on wideband measurement or narrowband measurement may be distinguished based on the measurement bandwidth value indicated by the measurement bandwidth information.

The range in which the measurement bandwidth information is applied may be defined as UE-specific information or frequency-specific information. The measurement bandwidth information, that is, the UE-specific information, may indicate a common bandwidth for the measurement of all frequencies of the same RAT. The measurement bandwidth information, that is, the frequency-specific information, may indicate a specific bandwidth of a frequency.

The UE sends a report message according to the measurement to the network (S1830). The report message may include at least one measurement result and at least one piece of measurement bandwidth information related to the at least one measurement result.

The aforementioned method of reporting measurement may be applied to logged measurement, accessibility measurement report, RLF/HOR report and/or IDC indicator transmission cases. Each of the cases is described below.

Figure 19:
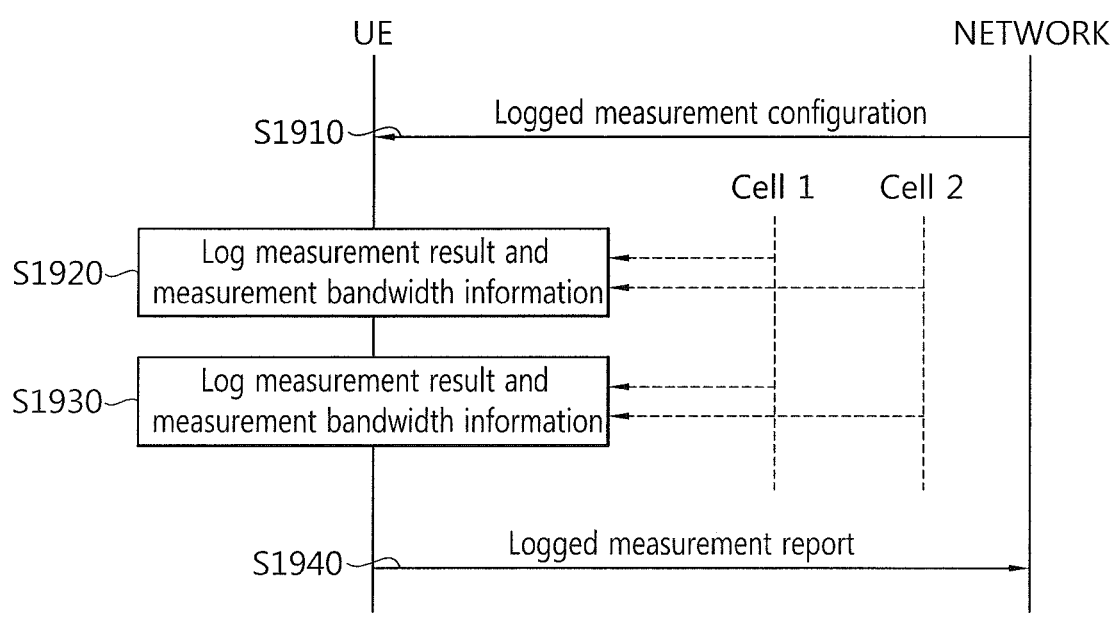
FIG. 19 is a diagram illustrating a first example in which an embodiment of the present invention has been applied to a logged MDT.

FIG. 19 is a diagram illustrating a first example in which an embodiment of the present invention has been applied to a logged MDT.

In the example of FIG. 19, it is assumed that UE has been configured to perform logging on a measurement result and measurement bandwidth information related to the measurement result for each log entry.

Referring to FIG. 19, the UE receives a logged measurement configuration from a network (S1910). The logged measurement configuration includes configuration information for performing a logged MDT to be executed by the UE, and may be implemented as described above. The UE receives the logged measurement configuration. When the UE enters an RRC idle state, the UE may perform measurement and logging for maximum logging duration.

The UE performs measurement and performs logging on the obtained measurement result (S1920, S1930). The UE may perform logging the measurement bandwidth information related to the measurement result along with the measurement result. The UE may include a specific measurement result and measurement bandwidth information related to the specific measurement result in each log entry.

The measurement result obtained by the UE may include a measurement result for a serving cell and/or neighbor cells.

The measurement bandwidth information may indicate whether the measurement performed in order to obtain the corresponding measurement result is wideband measurement or narrowband measurement. For example, if the UE has performed wideband measurement at step S1920 and has performed narrowband measurement at step S1930, measurement bandwidth information within a log entry that has been logged at step S1920 may indicate the wideband measurement, and measurement bandwidth information within a log entry that has been logged at step S1930 may indicate the narrowband measurement.

Alternatively, the measurement bandwidth information may indicate the value of a measurement bandwidth in the measurement performed in order to obtain the corresponding measurement result. For example, the measurement bandwidth information within the logged log entry by the UE at step S1920 may indicate a measurement bandwidth value related to the measurement result logged at step S1920. Furthermore, the measurement bandwidth information within the logged log entry by the UE at step S1930 may indicate a measurement bandwidth value related to the measurement result logged at step S1930.

The UE enters an RRC connection state and sends a logged measurement report message to the network (S1940). The logged measurement report message may include the log entries logged by the UE. The network may obtain at least one measurement result and measurement bandwidth information related to the at least one measurement result by receiving the logged measurement report message. The network may check that a specific measurement result has been obtained through measurement for what measurement bandwidth and apply it to the operation of the network.

In FIG. 19, each log entry has been illustrated as including measurement bandwidth information. However, if whether measurement bandwidth information is included or not indicates whether measurement is wideband measurement or narrowband measurement, an example in which a log entry including a narrowband measurement result does not include measurement bandwidth information may also be taken into consideration. For example, if the measurement result has been obtained through wideband measurement at step S1920, the log entry logged at step S1920 may include measurement bandwidth information. In contrast, if the measurement result has been obtained through narrowband measurement at step S1930, the log entry logged at step S1930 may not include measurement bandwidth information.

Figure 20:
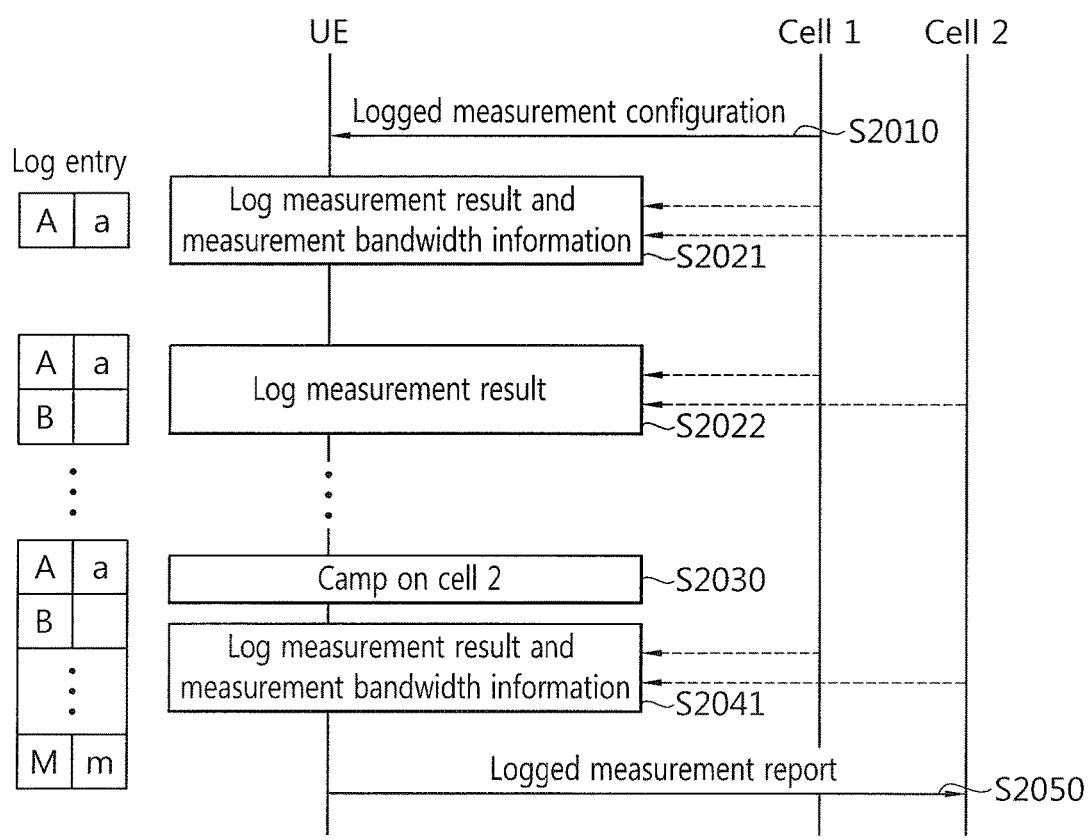
FIG. 20 is a diagram illustrating a second example in which an embodiment of the present invention has been applied to a logged MDT.

FIG. 20 is a diagram illustrating a second example in which an embodiment of the present invention has been applied to a logged MDT.

In the example of FIG. 20, it is assumed that UE has been configured to perform logging on measurement bandwidth information along with a measurement result when a serving cell is changed.

Referring to FIG. 20, the UE receives a logged measurement configuration from a network (S2010). The UE may receive the logged measurement configuration from a cell 1, that is, a serving cell on which the UE now camps. The logged measurement configuration includes configuration information for performing the logged MDT of the UE, and may be implemented as described above.

After receiving the logged measurement configuration, when the UE enters an RRC idle state the UE may perform measurement and logging for maximum logging duration.

The UE that camps on the cell 1 obtains a measurement result and performs logging on the measurement result (S2021).

The UE may determine whether wideband measurement is permitted when operating using the cell 1 as a serving cell. Whether the wideband measurement is permitted within a corresponding cell may be determined based on the capabilities of the UE and information related to the cell 1, that is, a serving cell. If the UE may perform wideband measurement and the cell 1 provides information for the wideband measurement, the UE may determine that the wideband measurement is possible and perform the wideband measurement. If not, the UE may perform narrowband measurement.

Since the cell 1 corresponds to first measurement, the UE may perform logging on measurement bandwidth information "a" related to the obtained measurement result A.

The measurement bandwidth information "a" may indicate whether the measurement performed in order to obtain the measurement result A is wideband measurement or narrowband measurement. Alternatively, the measurement bandwidth information "a" may indicate the value of the measurement bandwidth in the measurement performed in order to obtain the measurement result A.

The UE that continues to camp on the cell 1 obtains a measurement result according to a logging interval and performs logging on the measurement result (S2022). Since there is no change in the serving cell of the UE at step S2022, the UE may perform logging only on a measurement result B obtained at a corresponding point of time, but may not perform logging on measurement bandwidth information.

The UE may move and camp on a cell 2 (S2030). Accordingly, the UE may perform an operation in an RRC idle state using the cell 2 as a new serving cell.

The UE that camps on the cell 2 may obtain a measurement result and perform logging on the measurement result (S2040).

When the UE operates using the cell 2 as a serving cell, it may determine whether wideband measurement is permitted. Whether the wideband measurement is permitted within a corresponding cell may be determined based on the capabilities of the UE and information related to the cell 2, that is, a serving cell. If the UE is capable of performing wideband measurement and the cell 2 provides information for the wideband measurement, the UE may determine that the wideband measurement is possible and perform the wideband measurement. If not, the UE may perform narrowband measurement.

Since the serving cell has been changed prior to step S2040, the UE may perform logging on measurement bandwidth information 'm' related to a measurement result M.

The UE enters an RRC connection state and sends a logged measurement report message to the network (S2050). The logged measurement report message may include log entries logged by the UE. The network may be aware of a measurement bandwidth related to a corresponding measurement result through measurement bandwidth information within a specific log entry. The network may determine that the measurement results of a log entry that belongs to subsequently logged log entries and that has been logged prior to a log entry including the measurement bandwidth information have been obtained through the measurement of a measurement bandwidth.

That is, in general, the UE may perform measurement on a specific bandwidth within a single cell. In this case, the UE may perform wideband measurement or narrowband measurement depending on a serving cell. Accordingly, logging measurement bandwidth information due to a change in the serving cell of the UE is advantageous in that a measurement result and related measurement bandwidth information can be provided to a network and overhead attributable to added signaling can be minimized.

Figure 21:
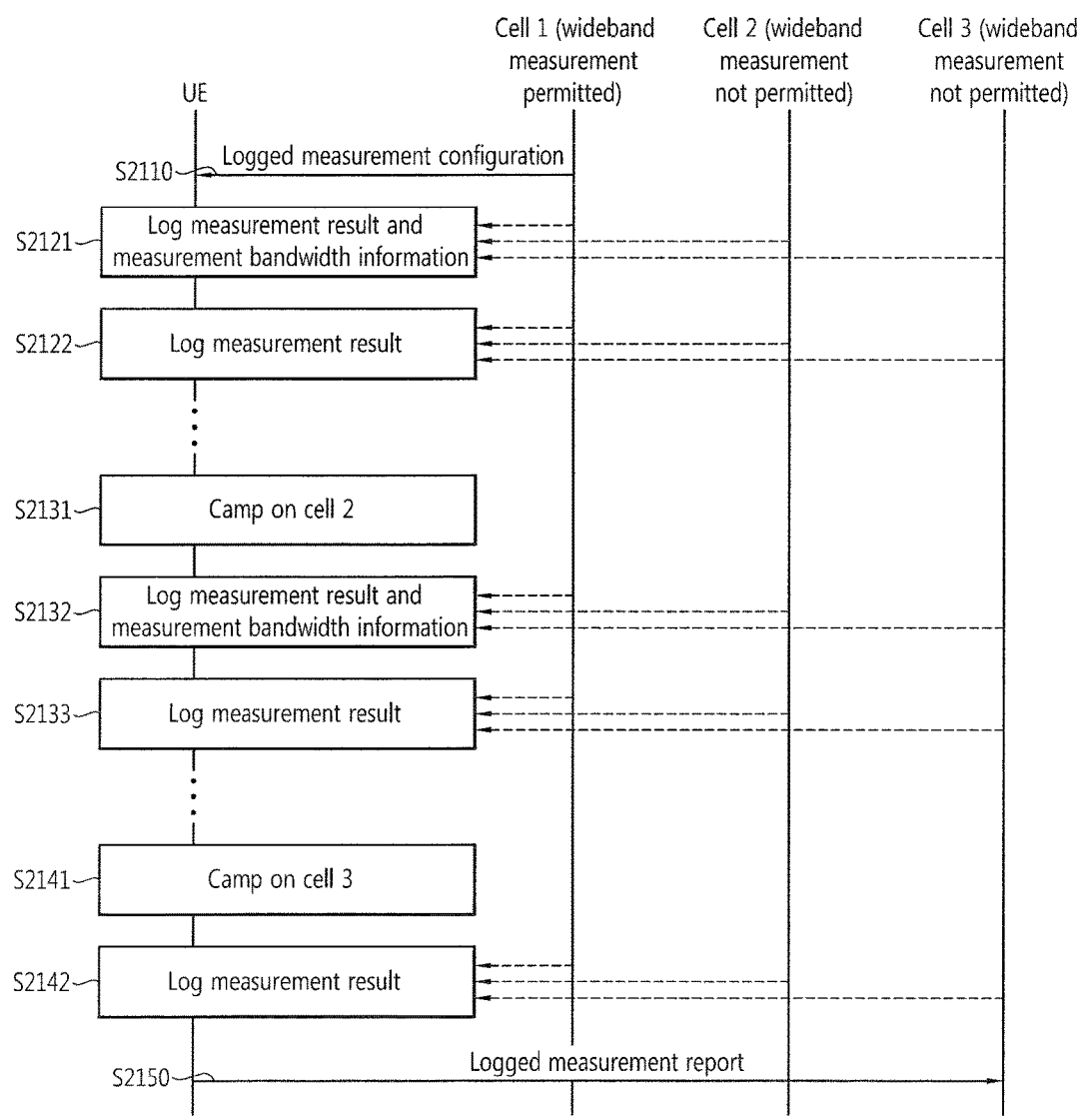
FIG. 21 is a diagram illustrating a third example in which an embodiment of the present invention has been applied to a logged MDT.

FIG. 21 is a diagram illustrating a third example in which an embodiment of the present invention has been applied to a logged MDT.

In the example of FIG. 21, it is assumed that UE has been configured to perform logging on measurement bandwidth information along with a measurement result when a measurement bandwidth for a measurement result is changed. It is assumed that the UE assumes that wideband measurement is possible and whether the UE will perform wideband measurement is determined by whether the wideband measurement of the serving cell of the UE is permitted.

Referring to FIG. 21, the UE receives a logged measurement configuration from a network (S2110). The UE may receive the logged measurement configuration from a cell 1, that is, a serving cell on which the UE now camps. The logged measurement configuration includes configuration information for the execution of the logged MDT by the UE, and may be implemented as described above.

After receiving the logged measurement configuration, when the UE enters an RRC idle state, it may perform measurement and logging for maximum logging duration.

The UE that camps on the cell 1 obtains a measurement result and performs logging on the measurement result (S2121). Since the cell 1 is a cell that permits wideband measurement, the UE may perform wideband measurement and obtain a measurement result.

Since the measurement performed by the UE at step S2121 corresponds to first measurement, the UE may perform logging on measurement bandwidth information related to the obtained measurement result. The measurement bandwidth information may indicate that the measurement performed in order to obtain the measurement result is wideband measurement.

The UE that continues to camp on the cell 1 obtains a measurement result according to a logging interval and performs logging on the measurement result (S2122). Since the measurement performed by the UE at step S2122 is wideband measurement, there is no change in the measurement bandwidth. Accordingly, the UE may perform logging on the measurement result, but may not perform logging on related measurement bandwidth information.

The UE may move and camp on a cell 2 (S2131). Accordingly, the UE may perform an operation in an RRC idle state using the cell 2 as a new serving cell.

The UE that camps on the cell 2 obtains a measurement result and performs logging on the measurement result (S2132). Since the cell 2 is a cell that does not perform wideband measurement, the UE may perform narrowband measurement and obtain a measurement result.

The UE may determine that the measurement bandwidth has been changed because the measurement result obtained at step S2132 has been obtained through the narrowband measurement and the measurement result obtained at step S2122 has been obtained through the wideband measurement. Accordingly, the UE may perform logging on measurement bandwidth information related to the measurement result obtained at step S2132. The measurement bandwidth information may indicate that the measurement performed in order to obtain the measurement result is narrowband measurement.

The UE that continues to camp on the cell 2 obtains a measurement result according to a logging interval and performs logging on the measurement result (S2133). There is no change in the measurement bandwidth because the measurement performed by the UE at step S2133 is narrowband measurement. Accordingly, the UE performs logging on the measurement result, but may not perform logging on measurement bandwidth information related to the measurement result.

The UE may move and camp on a third cell 3 (S2141). Accordingly, the UE may perform an operation in an RRC idle state using the cell 3 as a new serving cell.

The UE that camps on the cell 3 obtains a measurement result and performs logging on the measurement result (S2142). The UE may perform narrowband measurement and obtain the measurement result because the cell 3 is a cell that does not permit wideband measurement.

Since the serving cell of the UE has been changed, but the UE continues to perform the narrowband measurement, the UE may determine that there is no change in the measurement bandwidth. Accordingly, the UE performs logging on the measurement result, but may not perform logging on measurement bandwidth information related to the measurement result.

The UE enters an RRC connection state and sends a logged measurement report message to the network (S2150). The logged measurement report message may include log entries logged by the UE. The network may determine that the measurement results of a log entry that belongs to subsequently logged log entries and that has been logged prior to a log entry including the measurement bandwidth information have been obtained through the measurement of a measurement bandwidth.

The method of reporting measurement of FIG. 18 may also be applied to an RLF report and a handover failure report (if the type of radio link failure is a handover failure). In sending an RLF report and a handover failure report to a network, UE may include measurement bandwidth information in the RLF report and the handover failure report. The measurement bandwidth information may indicate whether measurement for radio link monitoring is based on wideband measurement or narrowband measurement. The measurement bandwidth information may indicate whether measurement before handover is performed is based on wideband measurement or narrowband measurement. Alternatively, the measurement bandwidth information may indicate a measurement bandwidth that is a base for measurement.

The method of reporting measurement of FIG. 18 may also be applied to an IDC indication. UE may indicate whether measurement for evaluating whether a specific frequency is unavailable within IDC is based on wideband measurement or narrowband measurement. Alternatively, the measurement bandwidth information may indicate a measurement bandwidth that is a base for measurement.

The method of reporting measurement of FIG. 18 may also be applied to an accessibility measurement report. When a failure for establishing RRC connection occurs, when UE sends an accessibility measurement report to a network, the UE may include measurement bandwidth information in a connection establishment failure report. The measurement bandwidth information may indicate whether measurement before connection establishment is performed is based on wideband measurement or narrowband measurement. Alternatively, the measurement bandwidth information may indicate a measurement bandwidth that is a base for measurement.

In the aforementioned method of reporting measurement according to the present invention, UE has been illustrated as including a wideband measurement result or narrowband measurement result in a measurement report message and sending the measurement report message, but the scope of the present invention is not limited thereto. In performing the method of reporting measurement in accordance with an embodiment of the present invention, if both wideband measurement and narrowband measurement are possible, UE may obtain, log, and report both a wideband measurement result and a narrowband measurement result.

In accordance with the method of reporting measurement according to an embodiment of the present invention, a network can check whether a measurement result reported by UE has been obtained based on wideband measurement or has been obtained based on narrowband measurement. Alternatively, the network can check a measurement bandwidth related to the reported measurement result. Accordingly, the network can more effectively perform network optimization depending on the use of the measurement result, can provide more efficient service, or can provide the UE with a configuration for the efficient operation of the UE.

Figure 22:
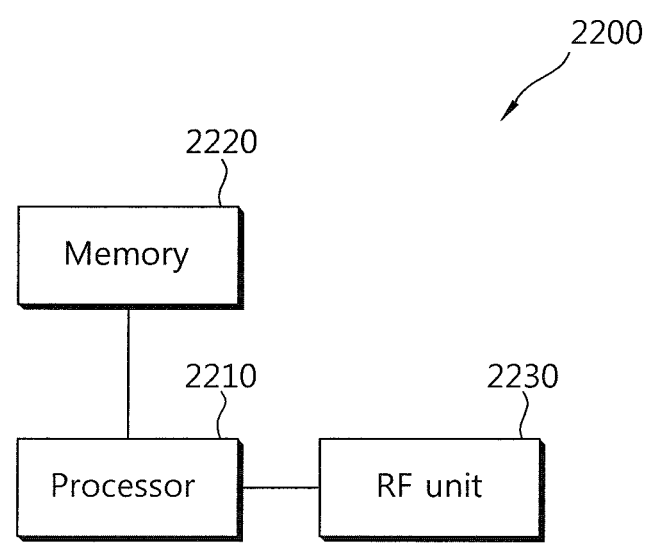
FIG. 22 is a block diagram illustrating a wireless apparatus in which an embodiment of the present invention is implemented.

FIG. 22 is a block diagram illustrating a wireless apparatus in which an embodiment of the present invention is implemented. The wireless apparatus may be implemented using UE or a network system for performing a cell reselection method in accordance with an embodiment of the present invention.

Referring to FIG. 22, the wireless apparatus 2200 includes a processor 2210, memory 2220, and a Radio Frequency (RF) unit 2230. The processor 2210 implements the proposed functions, processes and/or methods. The processor 2210 may be configured to report a measurement result and measurement bandwidth information to a network. The processor 2210 may be configured to perform the embodiments of the present invention described with reference to FIGS. 18 to 21.

The RF unit 2230 is connected to the processor 2210, and sends and receives radio signals.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method of sending user equipment (UE) information during a Minimization of Drive-Tests (MDT) procedure in a wireless communication system, the method performed by a UE and comprising:
   detecting a Radio Link Failure (RLF);
   entering a radio resource control (RRC) idle state after the RLF is detected;
   logging measurement information during the RRC idle state; and
   sending the UE information, which includes a report for the RLF and the logged measurement information, to a base station (BS) after a transition from the RRC idle state to an RRC connection state,
   wherein the report for the RLF includes a result of first Reference Signal Received Quality (RSRQ) measurement and a first wideband indicator for the first RSRQ measurement,
   wherein the result of the first RSRQ measurement is a RSRQ measurement result for a cell at which the RLF is detected,
   wherein the first wideband indicator indicates whether a wide bandwidth is used when performing the first RSRQ measurement,
   wherein the logged measurement information includes a result of second RSRQ measurement and a second wideband indicator for the second RSRQ measurement,
   wherein the result of the second RSRQ measurement is a RSRQ measurement result for a cell at which the measurement information is logged during the RRC idle state, and
   wherein the second wideband indicator indicates whether a wide bandwidth is used when performing the second RSRQ measurement.

2. The method of claim 1,
   wherein if a measurement bandwidth for the first RSRQ measurement is greater than a specific threshold bandwidth, the first wideband indicator indicates that the wide bandwidth is used when performing the first RSRQ measurement, and
   if the first measurement bandwidth for the first RSRQ measurement is smaller than the specific threshold bandwidth, the first wideband indicator indicates that a non-wide bandwidth is used when performing the first RSRQ measurement.

3. The method of claim 2, wherein the specific threshold bandwidth comprises a bandwidth corresponding to six resource blocks.

4. The method of claim 1, wherein the UE sends the UE information to the BS when the UE information is requested by the BS.

5. A user equipment (UE) comprising:
   a radio frequency (RF) unit that sends and receives radio signals; and
   a processor that is functionally coupled to the RF unit, wherein the processor:
       detects a Radio Link Failure (RLF),
       enters a radio resource control (RRC) idle state after the RLF is detected;
       logs measurement information during the RRC idle state; and
       controls the RF unit to send the UE information, which includes a report for the RLF and the logged measurement information, to a base station (BS) after a transition from the RRC idle state to an RRC connection state,
   wherein the report for the RLF includes a result of first Reference Signal Received Quality (RSRQ) measurement and a first wideband indicator for the first RSRQ measurement,
   wherein the result of the first RSRQ measurement is a RSRQ measurement result for a cell at which the RLF is detected,
   wherein the first wideband indicator indicates whether a wide bandwidth is used when performing the first RSRQ measurement,
   wherein the logged measurement information includes a result of the second RSRQ measurement and a second wideband indicator for the second RSRQ measurement,
   wherein the result of the second RSRQ measurement is a RSRQ measurement result for a cell at which the measurement information is logged during the RRC idle state, and
   wherein the second wideband indicator indicates whether a wide bandwidth is used when performing the second RSRQ measurement.

6. The UE of claim 5, wherein if a measurement bandwidth for the first RSRQ measurement is greater than a specific threshold bandwidth, the first wideband indicator indicates that the wide bandwidth is used when performing the first RSRQ measurement, and
   if the first measurement bandwidth for the first RSRQ measurement is smaller than the specific threshold bandwidth, the first wideband indicator indicates that a non-wide bandwidth is used when performing the first RSRQ measurement.

7. The UE of claim 6, wherein the specific threshold bandwidth comprises a bandwidth corresponding to six resource blocks.

8. The UE of claim 5, wherein the UE sends the UE information to the BS when the UE information is requested by the BS.

* * * * *